US009607448B2

(12) United States Patent
Ukai et al.

(10) Patent No.: US 9,607,448 B2
(45) Date of Patent: Mar. 28, 2017

(54) VEHICLE DIAGNOSIS SYSTEM, SERVER, AND COMPUTER PROGRAM

(71) Applicant: DENSO CORPORATION, Kariya, Aichi-pref. (JP)

(72) Inventors: Hiroki Ukai, Nagoya (JP); Naoki Muramatsu, Amstelveen (NL); Masakazu Yamada, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/784,069

(22) PCT Filed: Mar. 5, 2014

(86) PCT No.: PCT/JP2014/001205
§ 371 (c)(1),
(2) Date: Oct. 13, 2015

(87) PCT Pub. No.: WO2014/174749
PCT Pub. Date: Oct. 30, 2014

(65) Prior Publication Data
US 2016/0055686 A1 Feb. 25, 2016

(30) Foreign Application Priority Data
Apr. 22, 2013 (JP) .................................. 2013-089663

(51) Int. Cl.
*G07C 5/00* (2006.01)
*G07C 5/08* (2006.01)
*G05B 19/042* (2006.01)

(52) U.S. Cl.
CPC ......... *G07C 5/008* (2013.01); *G05B 19/0428* (2013.01); *G07C 5/0808* (2013.01); *G07C 5/0825* (2013.01); *G05B 2219/45018* (2013.01)

(58) Field of Classification Search
CPC ...... G05B 19/0428; G05B 2219/45018; G07C 5/008; G07C 5/0808; G07C 5/0825
(Continued)

(56) References Cited

U.S. PATENT DOCUMENTS 8,897,952 B1\* 11/2014 Palmer .................. G07C 5/008
701/29.1
2002/0133273 A1 9/2002 Lowrey et al.
(Continued)

FOREIGN PATENT DOCUMENTS

JP 2002331884 A 11/2002
JP 2005036935 A 2/2005
(Continued)

OTHER PUBLICATIONS

International Search Report and Written Opinion (in Japanese with English Translation) for PCT/JP2014/001205, mailed Apr. 8, 2014; ISA/JP.

*Primary Examiner* — Tyler J Lee
(74) *Attorney, Agent, or Firm* — Harness, Dickey & Pierce, P.L.C.

(57) ABSTRACT

According to one embodiment of the present disclosure, there is provided a vehicle diagnosis system equipped with a communication terminal for transmitting vehicle information acquired from a vehicle to a server, and a server for analyzing the vehicle information received from the communication terminal and diagnosing the vehicle. The server is provided with a WEB screen providing unit for providing a WEB screen including instructions for the operator in a manner that the communication terminal can display via a communication network. The communication terminal displays the provided WEB screen via the communication network.

13 Claims, 20 Drawing Sheets

(58) Field of Classification Search
USPC .................................... 701/31.4, 31.5, 33.2
See application file for complete search history.

(56) References Cited

U.S. PATENT DOCUMENTS

| | | | | |
|---|---|---|---|---|
| 2006/0235580 | A1* | 10/2006 | Weiss | B60R 16/02 |
| | | | | 701/2 |
| 2008/0183484 | A1 | 7/2008 | Kondo et al. | |
| 2010/0023203 | A1* | 1/2010 | Shibi | G07C 5/0808 |
| | | | | 701/31.4 |
| 2013/0304306 | A1* | 11/2013 | Selkirk | G07C 5/008 |
| | | | | 701/31.4 |
| 2014/0121888 | A1* | 5/2014 | Guo | G07C 5/008 |
| | | | | 701/31.4 |

FOREIGN PATENT DOCUMENTS

| | | |
|---|---|---|
| JP | 2008179314 A | 8/2008 |
| JP | 2010032431 A | 2/2010 |

* cited by examiner

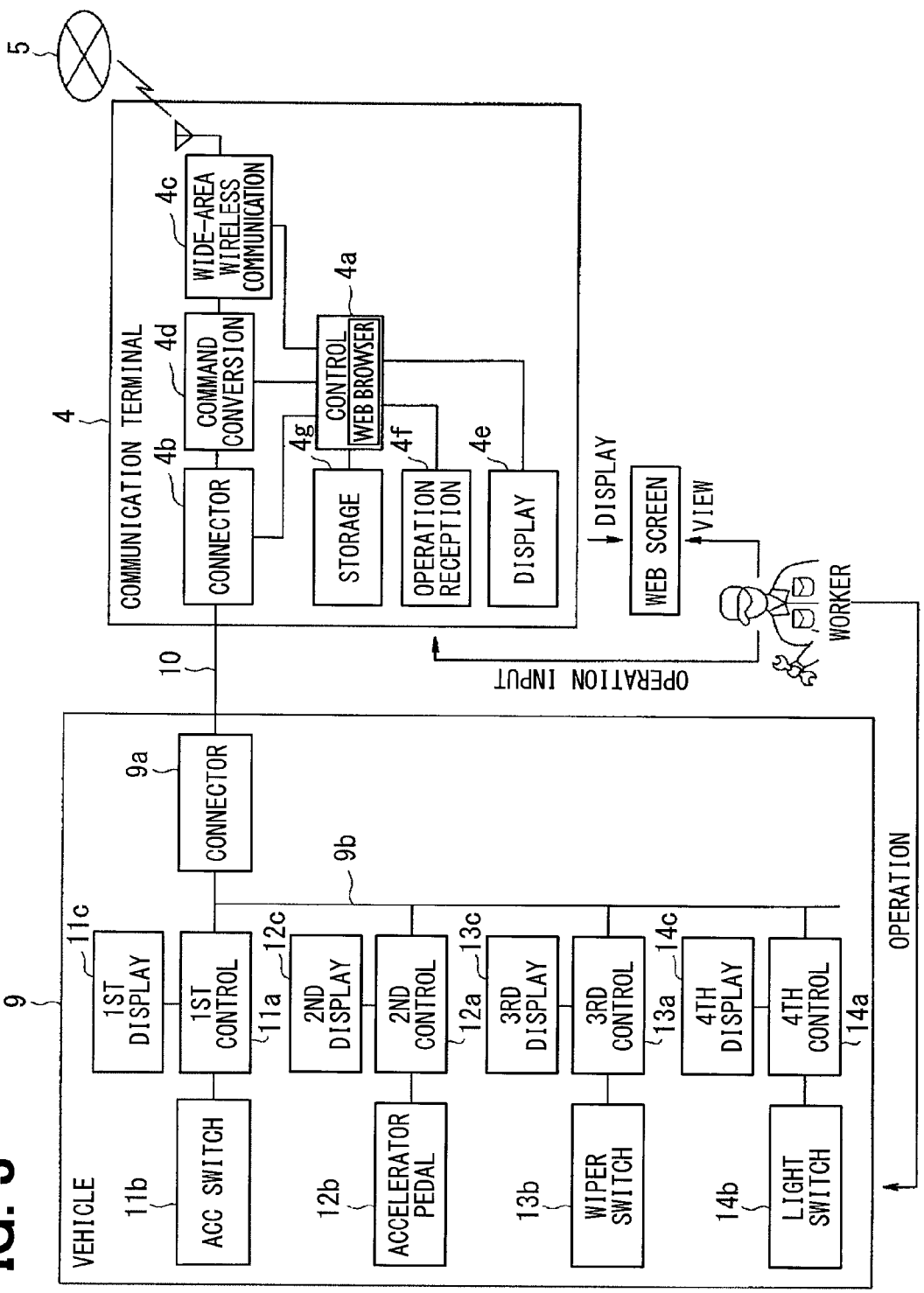

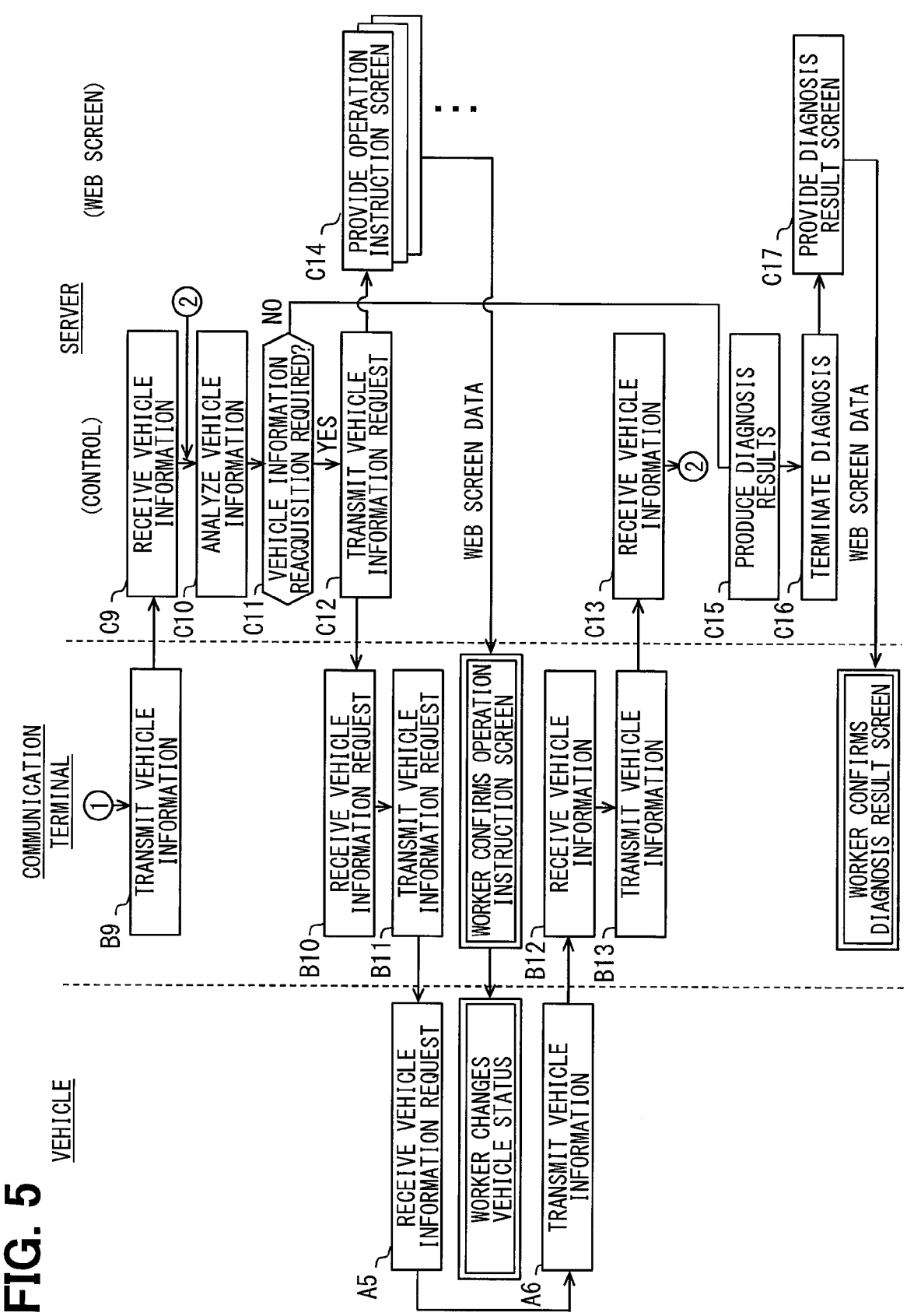

FIG. 17

DIAGNOSIS RESULT SCREEN

■ DIAGNOSTIC SERVICE
FUNCTION TOOL HELP

| CHARGE | IDLING | 13.8 | ▶ | 13.8 | 12 | ~14.5 | V |

☐ DIAGNOSIS OF ENGINE CONTROL SENSOR — 108

| ITEMS | MEASUREMENT CONDITIONS | PRESENT | PREVIOUS | STANDARD VALUE | | |
|---|---|---|---|---|---|---|
| THROTTLE SENSOR BANK 1 | FULLY CLOSED | 16.5 ▶ | 16.5 | 10 | ~22 | % |
| | FULLY OPEN | 81.2 ▶ | 81.6 | 64 | ~96 | % |
| AFROMETER BANK 1 | IDLING | 2.49 ▶ | 2.39 | 2.1 | ~3.1 | g/s |
| | 2000rpm | 6.88 ▶ | 6.51 | 6.2 | ~8.7 | g/s |
| A/F SENSOR BANK 1 SENSOR 1 | FULLY OPEN (LEAN) | 1.232 ▶ | 1.232 | 1.2 | TIMES OR MORE | |
| | FULLY OPEN (RICH) | 0.821 ▶ | 0.821 | 0.88 | TIMES OR LESS | |
| O2 SENSOR BANK 1 SENSOR 2 | FULLY CLOSED (LEAN) | 0.01 ▶ | 0.01 | 0.3 | V OR LOWER | |
| | FULLY OPEN (RICH) | 0.94 ▶ | 0.01* | 0.6 | V OR HIGHER | |

☐ MECHANIC REPORT

[ PREVIEW ]

START          PROJECT

FIG. 18

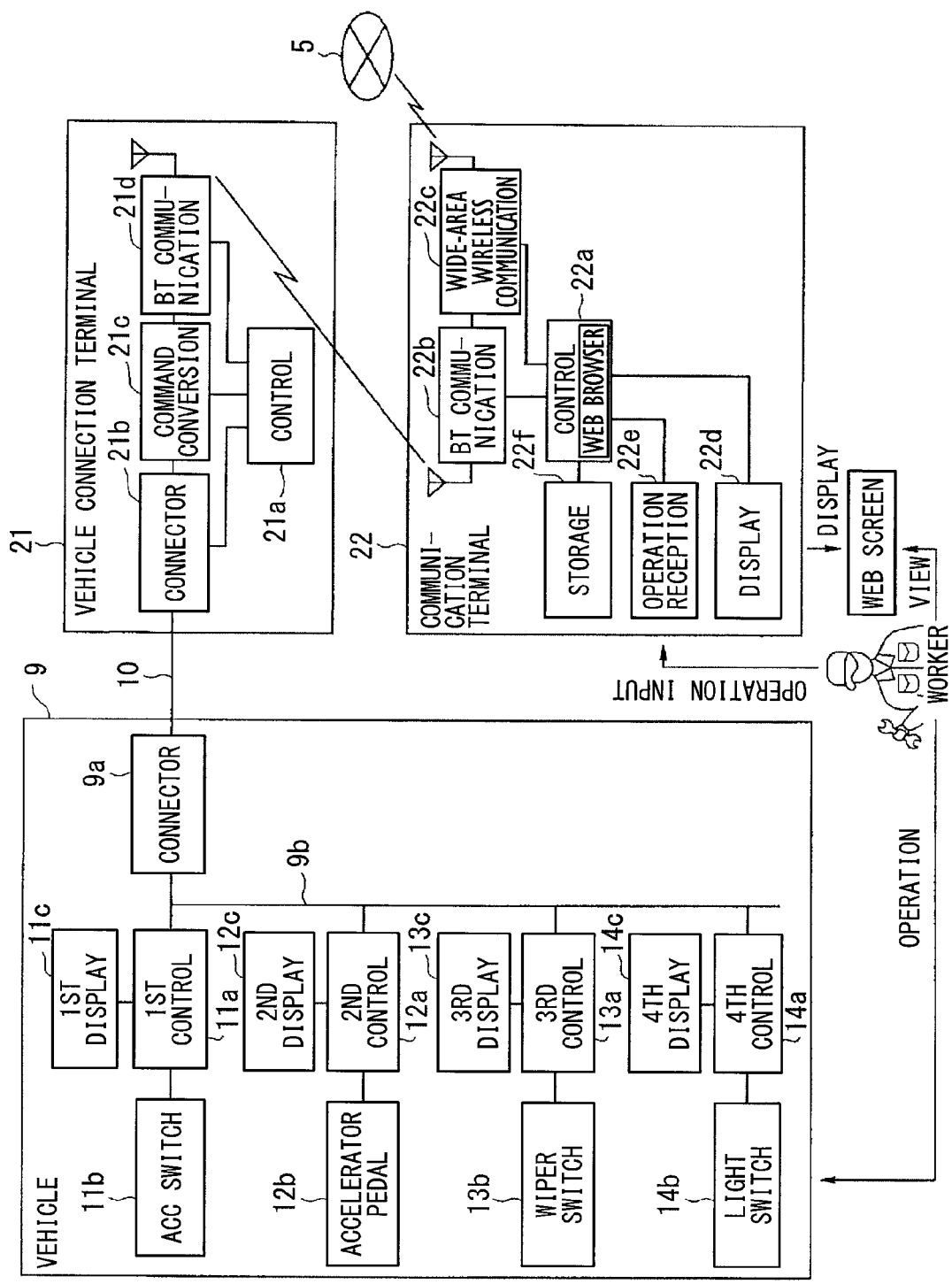

VEHICLE DIAGNOSIS SYSTEM, SERVER, AND COMPUTER PROGRAM

CROSS REFERENCE TO RELATED APPLICATIONS

This application is a U.S. National Phase Application under 35 U.S.C. 371 of International Application No. PCT/JP2014/001205 filed on Mar. 5, 2014 and published in Japanese as WO 2014/174749 A1 on Oct. 30, 2014. This application is based on and claims the benefit of priority from Japanese Patent Application No. 2013-089663 filed on Apr. 22, 2013. The entire disclosures of all of the above applications are incorporated herein by reference.

TECHNICAL FIELD

The present disclosure relates to a vehicle diagnosis system, a server, and a computer program. The vehicle diagnosis system includes a communication terminal and the server. The communication terminal acquires vehicle information from a vehicle and transmits the acquired vehicle information to the server. The server receives the vehicle information from the communication terminal and analyzes the received vehicle information to diagnose the vehicle.

BACKGROUND ART

In a vehicle diagnosis system disclosed, for example, in patent literature 1, a server and a communication terminal coordinate with each other to diagnose a vehicle. The vehicle diagnosis system is configured so that the server transmits instructions for a vehicle diagnosis worker (for example, a maintenance engineer) to the communication terminal, and that the communication terminal displays the transmitted instructions.

The inventors of the present disclosure have found the following regarding the vehicle diagnosis system. A configuration disclosed in patent literature 1 enables the communication terminal to display the instructions for the worker. Therefore, the worker can diagnose the vehicle according to the instructions. However, when the configuration disclosed in patent literature 1 is used, the instructions for the worker, which are displayed by the communication terminal, namely, the instructions provided from the server to the worker, are limited to instructions that the communication terminal receives from the server. Thus, the content of instructions (the amount of information) given from the server to the worker is limited. For example, complicated instructions describing multiple procedures might not be easily given to the worker. The complicated instructions are, for example, instructions for starting up an engine and then increasing the speed of the engine to a predetermined value. Further, when the content of instructions to be given from the server to the worker is to be increased, an increased burden might be placed on the communication terminal since, for example, it might be necessary to include a large-capacity storage portion into the communication terminal and perform a complicated maintenance procedure for software.

PRIOR ART DOCUMENT

Patent Document

Patent literature 1: JP 2008-179314A

SUMMARY OF THE INVENTION

It is an object of the present disclosure to provide a vehicle diagnosis system, a server, and a computer program that enable to properly provide diagnostic instructions to a worker without placing an increased burden on a communication terminal.

According to a first aspect of the present disclosure, a vehicle diagnosis system includes a communication terminal, and a server. The communication terminal transmits vehicle information acquired from a vehicle to the server. The server analyzes the vehicle information received from the communication terminal to diagnose the vehicle. The server includes a web screen provision portion that provides a web screen including instructions for a worker diagnosing the vehicle, so that the communication terminal displays the web screen through a communication network. The communication terminal displays the web screen provided from the web screen provision portion through the communication network.

According to a second aspect of the present disclosure, a server providing a vehicle diagnosis system together with a communication terminal and analyzing vehicle information received from the communication terminal to diagnose a vehicle, the communication terminal transmitting the vehicle information acquired from the vehicle to the server, is provided. The server includes a web screen provision portion providing a web screen including an instruction for a worker diagnosing the vehicle, so that the communication terminal displays the web screen through a communication network.

According to a third aspect of the present disclosure, a computer program that causes a computer to perform a procedure for enabling a communication terminal to display a web screen including an instruction for a worker diagnosing a vehicle through a communication network is provided. The computer is provided to a server. The server provides a vehicle diagnosis system together with the communication terminal, which transmits vehicle information acquired from the vehicle to the server, and analyzes the vehicle information received from the communication terminal to diagnose the vehicle. A non-transitory tangible readable storage medium causing a computer program to perform the above procedure is provided.

According the vehicle diagnosis system, the server, and the computer program, a web screen including instructions for a worker diagnosing a vehicle is provided from the server to the communication terminal through a communication network. Therefore, it may be possible that the worker grasps the instructions for the worker by viewing the web screen displayed on the communication terminal. It may be possible that the worker diagnoses the vehicle according to the instructions. In this case, even when the instructions are complicated as they describe, for example, multiple procedures, it may be possible that the server sequentially updates the web screen so as to properly give the complicated instructions to the worker.

The server provides a web screen to give the instructions for the worker. It may be possible to avoid an increase in the burden placed on the communication terminal without requiring a large-capacity storage portion for the communication terminal and complicated maintenance for software. Further, it may be possible that various web screens are created to properly handle a wide variety of vehicle characteristics (for example, vehicle models, engine types, drive methods (2WD/4WD), and transmissions). It may be unnecessary to prepare multiple communication terminals for different vehicle characteristics to be diagnosed. In other words, it may be possible to diagnose a wide variety of vehicles with the use of one communication terminal. Any communication terminal may be used as long as it is capable of displaying a web screen. It may be possible that a general communication terminal may be used. This requirement may be easily provided.

BRIEF DESCRIPTION OF THE DRAWINGS

The above and other objects, features and advantages of the present disclosure will become more apparent from the following detailed description made with reference to the accompanying drawings. In the drawings:

FIG. 3 is a block diagram illustrating a configuration of a vehicle and of a communication terminal;

FIG. 5 is a diagram illustrating a third part of the processing steps;

FIG. 17 is a diagram illustrating a part of the diagnosis result screen;

FIG. 18 is a diagram illustrating a printout of diagnosis results; and

FIG. 19 is a diagram illustrating an overall configuration of a second embodiment of the present disclosure.

PREFERRED EMBODIMENTS FOR CARRYING OUT THE INVENTION

First Embodiment

Figure 1:
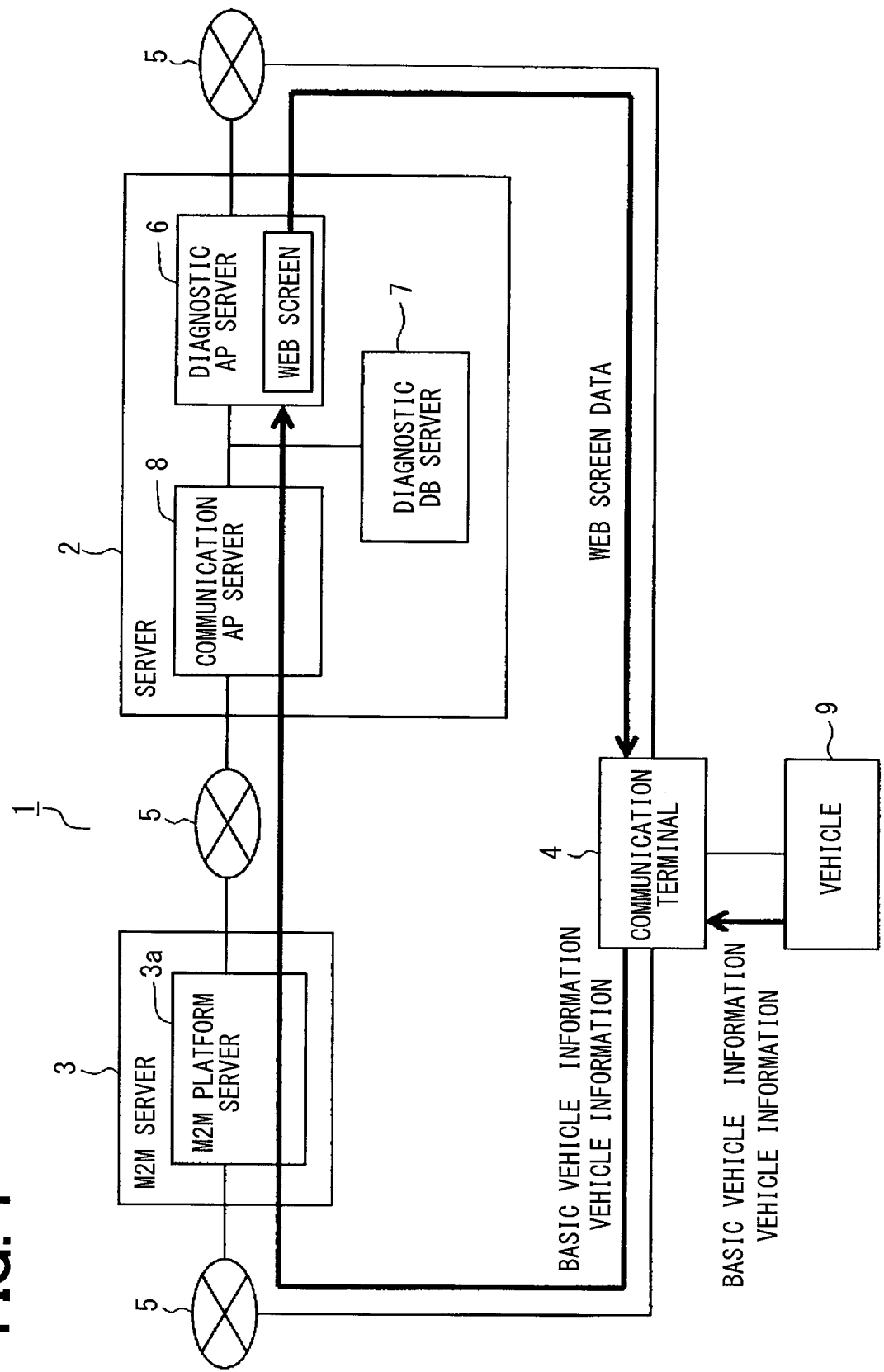
FIG. 1 is a diagram illustrating an overall configuration of a first embodiment of the present disclosure.

A first embodiment of the present disclosure will be described with reference to FIG. 1 to FIG. 18. As illustrated in FIG. 1, a vehicle diagnosis system 1 includes a server 2, a machine-to-machine (M2M) server 3, and a communication terminal 4. The server 2, the M2M server 3, and the communication terminal 4 are connectable to each other through the Internet 5. The Internet 5 may correspond to an example of a communication network. The M2M server 3 may correspond to a different server.

The server 2 may be functionally divided into a diagnostic application server 6 (a diagnostic AP server), a diagnostic database server 7 (a diagnostic DB server), and a communication application server 8 (a communication AP server). The diagnostic DB server 7 stores diagnostic information required for vehicle diagnosis. The diagnostic AP server 6 reads the diagnostic information stored in the diagnostic DB server 7 and diagnoses a vehicle by using the read diagnostic information. The communication AP server 8 controls data communication between the server 2 and the M2M server 3.

Figure 2:
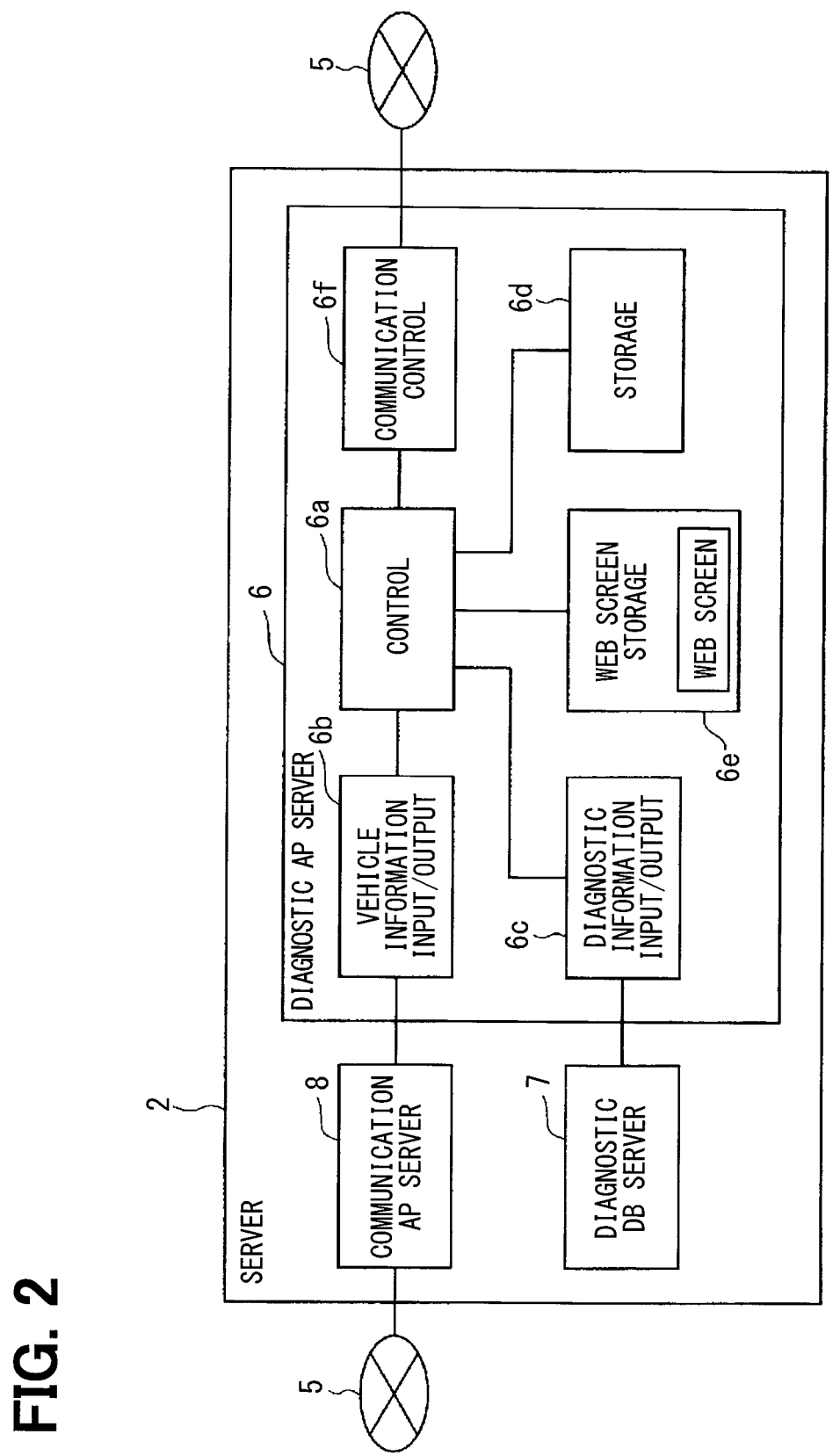
FIG. 2 is a block diagram illustrating a configuration of a server.
Figure 4A:
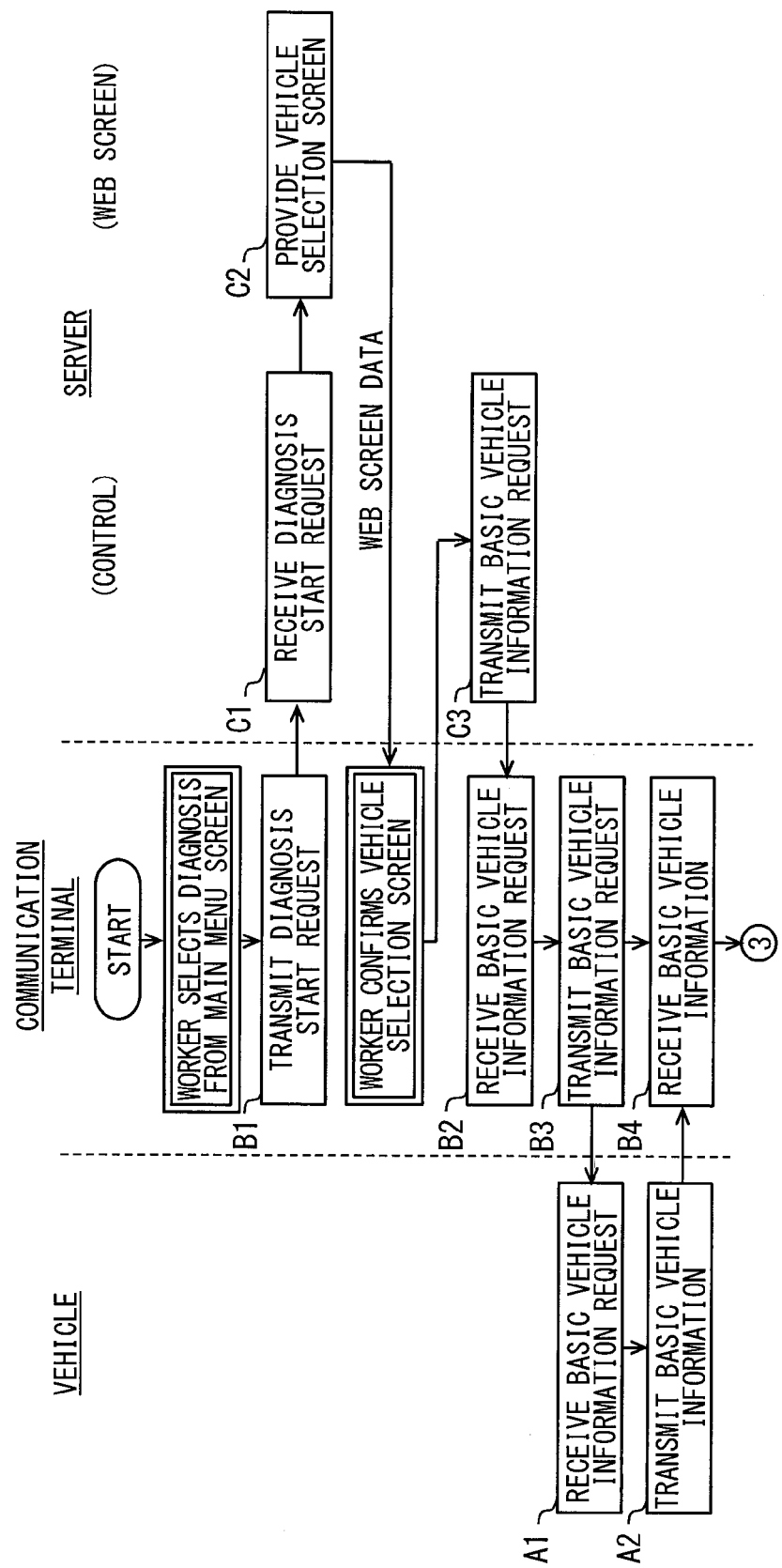
FIG. 4A is a diagram illustrating a first part of processing steps.
Figure 4B:
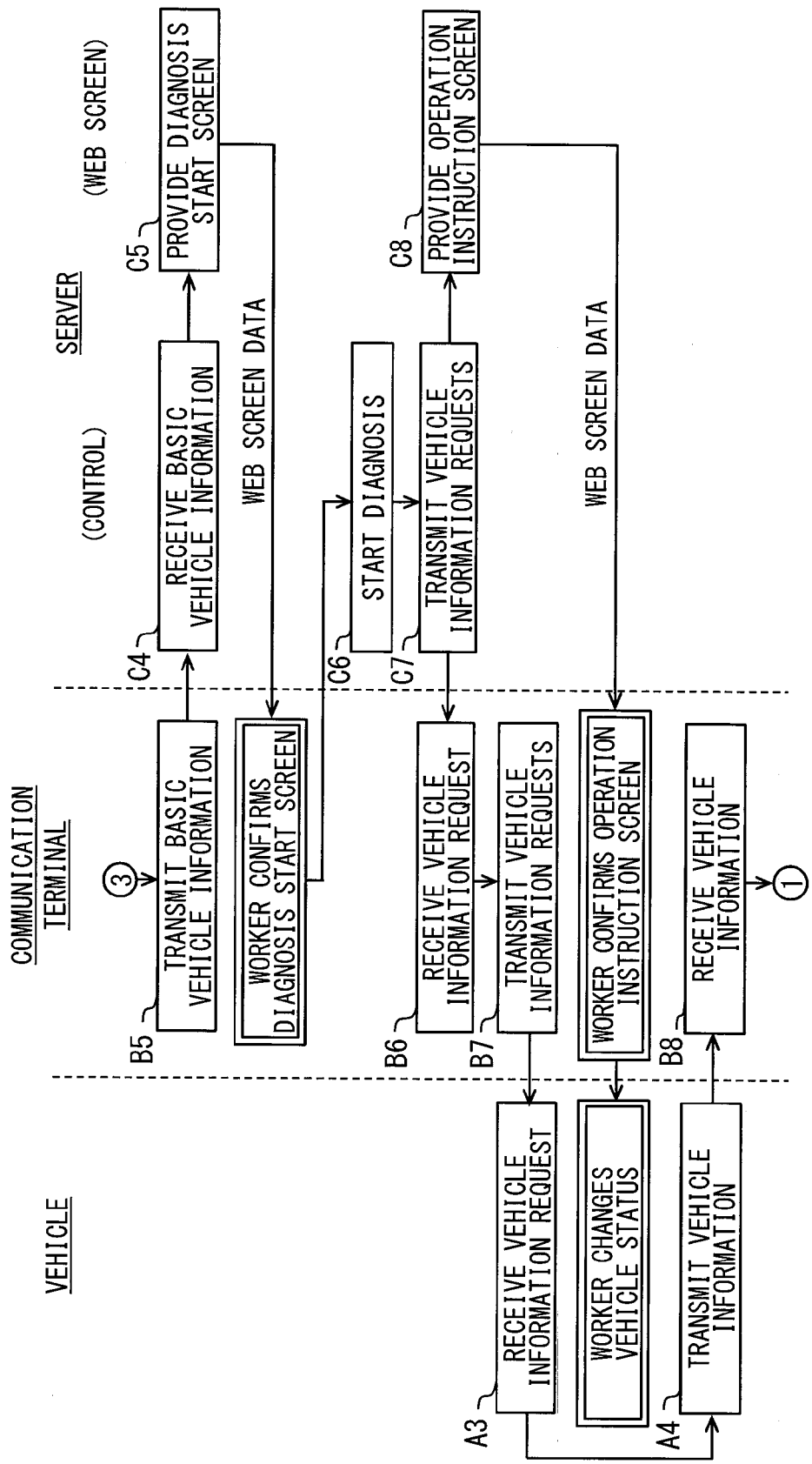
FIG. 4B is a diagram illustrating a second part of the processing steps.

As illustrated in FIG. 2, the diagnostic AP server 6 includes a control portion 6a, a vehicle information input/output portion 6b, a diagnostic information input/output portion 6c, a storage portion 6d, a web screen storage portion 6e, and a communication control portion 6f. The control portion 6a includes a microcomputer that includes a central processing portion (CPU), a read-only memory (ROM), and a random-access memory (RAM). The control portion 6a controls the overall operation of the diagnostic AP server 6 by allowing the CPU to execute a computer program stored in the ROM. The ROM is an example of a non-transitory tangible readable storage medium. The control portion 6a may correspond to an example of a web screen provision portion and a computer.

The vehicle information input/output portion 6b receives basic vehicle information and vehicle information, which are transmitted from the communication terminal 4 through the M2M sever 3 and received by the communication AP server 8, and outputs the input basic vehicle information and vehicle information to the control portion 6a. The vehicle information corresponds to diagnostic information, data, or the like. The diagnostic information input/output portion 6c receives diagnostic information stored in the diagnostic DB server 7, and outputs the diagnostic information to the control portion 6a. The storage portion 6d stores various data required for the control portion 6a to perform various data processes. The data stored in the storage portion 6d includes screen source data used as a material for a web screen.

The control portion 6a reads the screen source data stored in the storage portion 6d, creates a web screen by using the read screen source data, and stores the created web screen in the web screen storage portion 6e. The web screen used in the present embodiment is a screen that can be published on the Internet by using a World Wide Web (WWW) system and includes, for example, text data, layout information based on HyperText Markup Language (HTML), and document-embedded images, audio, and movies.

The communication control portion 6f controls data communication between the diagnostic AP server 6 and the communication terminal 4 in order to transmit web screen data for a web screen to the communication terminal 4 and receive an operation signal that is transmitted from the communication terminal 4 in response to a worker's operation at the communication terminal 4. When an operation signal transmitted from the communication terminal 4 is received through the communication control portion 6 or when vehicle information transmitted from the communication terminal 4 is received through the vehicle information input/output portion 6b, the control portion 6a selects a web screen out of web screens stored in the web screen storage portion 6e that is to be provided to the worker (that can be displayed by the communication terminal 4 through the Internet), and prepares for transmission of the web screen data forming the selected web screen. Incidentally, to permit the server 2 to provide a web screen is to enable the communication terminal 4 to display the web screen through the Internet 5.

When a transmission condition of a web screen data prepared for transmission is satisfied, the control portion 6a causes the communication control portion 6f to transmit the web screen data to the communication terminal 4. When the server 2 transmits the web screen data to the communication terminal 4, the web screen provided by the server 2 is displayed by the communication terminal 4 through the Internet 5. In other words, it may be possible that the worker views the web screen, which is created by the server 2, through the communication terminal 4.

The M2M server 3 includes an M2M platform server 3a. The M2M server 3 is connected to the server 2 through the Internet 5. Therefore, the M2M server 3 exchanges the basic vehicle information and vehicle information with the server 2 through the Internet 5. The M2M server 3 is also connected through the Internet 5 to a server (not shown) having a different function, for example, of managing the basic vehicle information and vehicle information. Therefore, the M2M server 3 also exchanges the basic vehicle information and vehicle information with such a server through the Internet 5.

The communication terminal 4 is, for example, a tablet computer that is portable by the worker who diagnoses the vehicle. The worker carrying the communication terminal 4 enables to diagnose the vehicle without being limited to a specific range of work while viewing a web screen displayed on the communication terminal 4 for confirmation. As illustrated in FIG. 3, the communication terminal 4 includes a control portion 4a, a connector 4b, a wide-area wireless communication portion 4c, a command conversion portion 4d, a display portion 4e, an operation reception portion 4f, and a storage portion 4g.

The control portion 4a includes a microcomputer that includes a CPU, a ROM, and a RAM. The control portion 4a controls the overall operation of the communication terminal 4 by allowing the CPU to execute a computer program stored in the ROM. The connector 4b is a connection terminal compliant with the OBD (On-Board Diagnostics) 2 standard and connectable to a connection cable 10 for acquiring vehicle information from a vehicle 9. In the present embodiment, it is supposed that the communication terminal 4 and the vehicle 9 are wire-connected by using the connection cable 10. Alternatively, the communication terminal 4 may be wirelessly connected to the vehicle 9.

The wide-area wireless communication portion 4c is connectable to the Internet 5. While the wide-area wireless communication portion 4c and the server 2 are connected to the Internet 5, the wide-area wireless communication portion 4c can receive web screen data from the server 2 and transmit the basic vehicle information and vehicle information acquired from the vehicle 9 to the server 2 through the M2M server 3. The expression "can receive" corresponds to the expression "can download". The command conversion portion 4d performs conversion (protocol conversion) between a data type (protocol) of the basic vehicle information and vehicle information exchanged between the communication terminal 4 and the vehicle 9 and the data type of the basic vehicle information and vehicle information exchanged between the communication terminal 4 and the server 2 through the Internet 5. The display portion 4e includes, for example, a liquid-crystal display having touch capabilities.

The control portion 4a incorporates a web browser (Internet browser or WWW browser). The functions of the web browser enable the control portion 4a to display a web screen on the display portion 4e and follow links through the use of web screen data that the wide-area wireless communication portion 4c receives from the server 2. The operation reception portion 4f includes, for example, touch switches that are formed on a web screen displayed on the display portion 4e. The operation reception portion 4f accepts setup and input operations performed by the worker. The storage portion 4g stores various data required for the control portion 4a to perform various data processes.

The vehicle 9 includes a connector 9a, a first control portion 11a, a second control portion 12a, a third control portion 13a, and a fourth control portion 14a. The connector 9a is connectable to the connection cable 10. The first control portion 11a, the second control portion 12a, the third control portion 13a, and the fourth control portion 14a are connected to the connector 9a through a controller area network (CAN) 9b. The first control portion 11a detects whether an ACC (accessory) switch 11b is on or off, and causes a first display portion 11c (an indicator) to display the result of detection. The second control portion 12a detects the amount of operation (the amount of depression) of an accelerator pedal 12b, and causes a second display portion 12c (a tachometer) to display the result of detection. The third control portion 13a detects the position (for example, high speed, medium speed, low speed, or off) in which a wiper switch 13b is placed, and causes a third display portion 13c (an indicator) to display the result of detection. The fourth control portion 14a detects the position (for example, all lights, width indicator, or off) in which a light switch 14b is placed, and causes a fourth display portion 14c (an indicator) to display the result of detection.

When the first display portion 11c displays a detection result indicating whether the ACC switch 11b is on or off, the worker enables to confirm whether the ACC switch 11b is on or off. When the second display portion 12c displays a detection result indicating the amount of operation of the accelerator pedal 12b, the worker enables to confirm the amount of operation of the accelerator pedal 12b. When the third display portion 13c displays a detection result indicating the position in which the wiper switch 13b is placed, the worker enables to confirm the position in which the wiper switch 13b is placed. When the fourth display portion 14c displays a detection result indicating the position in which the light switch 14b is placed, the worker enables to confirm the position in which the light switch 14b is placed.

While the communication terminal 4 is connected to the vehicle 9 through the connection cable 10, the communication terminal 4 transmits a basic vehicle information request or a vehicle information request to the vehicle 9 to receive (acquire) the basic vehicle information or vehicle information from the vehicle 9. The basic vehicle information is, for example, information about an ID (identification information) of an electronic control unit (ECU) mounted to the vehicle 9. The basic vehicle information is used to authenticate whether data communication is established between the server 2 and the vehicle 9. The vehicle information is a collection of diagnostic information and data. The diagnostic information is information, for example, about diagnostic trouble codes (DTCs) or troubleshooting codes of various sensors and actuators, which are retained by the ECU mounted in the vehicle 9, a freeze frame data (FFD), and a pending. The data is information, for example, about control states of various sensors and actuators, such as an engine speed and an engine cooling water temperature, the on/off state of the ACC switch 11b, the amount of operation of the accelerator pedal 12b, the position in which the wiper switch 13b is placed, and the position in which the light switch 14b is placed. When the worker changes the status of the vehicle, this change is reflected in the vehicle information. When, for example, the worker operates (depresses) the accelerator pedal 12b, the resulting change in the amount of operation of the accelerator pedal 12b is reflected in the vehicle information.

In this configuration, the basic vehicle information and vehicle information transmitted from the communication terminal 4 are received by the server 2 through the M2M server 3, as illustrated in FIG. 1. The web screen data transmitted from the server 2 is directly received by the communication terminal 4, bypassing the M2M server 3. In other words, a route through which the basic vehicle information and vehicle information acquired from the vehicle 9 is transmitted from the communication terminal 4 and received by the server 2 is different from a route through which the web screen data is transmitted from the server 2 and received by the communication terminal 4.

Operations of the configuration will be described with reference to FIG. 4A to FIG. 18. While the communication terminal 4 is connected to the server 2 through the Internet 5, according to functions of the web browser, the communication terminal 4 receives web screen data from the server 2 and uses the received web screen data to display a web screen. When the worker selects a diagnosis item from a main menu screen displayed on the display portion 4e, the communication terminal 4 transmits a diagnosis start request from the wide-area wireless communication portion 4c to the server 2 (B1).

When the communication control portion 6f receives the diagnosis start request transmitted from the communication terminal 4 (C1), the server 2 selects a vehicle selection screen from web screens stored in the web screen storage portion 6e and provides the vehicle selection screen (C2). When the server 2 provides the vehicle selection screen, the functions of the web browser enable the communication terminal 4 to receive web screen data for the vehicle selection screen from the server 2 and display the vehicle selection screen on the display portion 4e by using the received web screen data. In other words, it may be possible that the worker views the vehicle selection screen displayed on the communication terminal 4 for confirmation purposes, selects a vehicle to be diagnosed, and proceeds to the next process.

When the vehicle 9 to be diagnosed is a newly encountered vehicle (a new vehicle), the worker inputs, for example, a vehicle registration number and a vehicle identification number to determine the vehicle 9 to be diagnosed. The newly encountered vehicle is a vehicle that has never been diagnosed by the vehicle diagnosis system 1 and is to be diagnosed for the first time. When the vehicle 9 to be diagnosed is not a newly encountered vehicle, the worker selects the vehicle 9 from vehicles having registered vehicle registration numbers and vehicle identification numbers to determine the vehicle 9 to be diagnosed. A vehicle that is not newly encountered is a vehicle that has previously been diagnosed by the vehicle diagnosis system 1 and is to be diagnosed for the second or subsequent time.

When the worker determines the vehicle 9 to be diagnosed, the server 2 causes the communication AP server 8 to transmit the basic vehicle information request to the communication terminal 4 through the M2M server 3 (C3). When the wide-area wireless communication portion 4c receives the basic vehicle information request transmitted from the server 2 (B2), the communication terminal 4 performs a command conversion to the received basic vehicle information request and transmits the resulting basic vehicle information request to the vehicle 9 through the connection cable 10 (B3). Upon receipt of the basic vehicle information request transmitted from the communication terminal 4 (A1), the vehicle 9 transmits the basic vehicle information matching the received basic vehicle information request to the communication terminal 4 through the connection cable 10 (A2). Upon receipt of the basic vehicle information transmitted from the vehicle 9 (B4), the communication terminal 4 performs the command conversion to the received basic vehicle information and causes the wide-area wireless communication portion 4c to transmit the resulting basic vehicle information to the server 2 through the M2M server 3 (B5).

When the communication AP server 8 receives the basic vehicle information transmitted from the communication terminal 4 (C4), the server 2 authenticates on the basis of the received basic vehicle information whether data communication is established between the server 2 and the vehicle 9. When it is determined that the data communication is established between the server 2 and the vehicle 9, the server 2 selects a diagnosis start screen from web screens stored in the web screen storage portion 6e and provides the diagnosis start screen (C5). When the server 2 provides the diagnosis start screen, the communication terminal 4 receives to receive web screen data for the diagnosis start screen from the server 2 with the functions of the web browser. The communication terminal 4 displays the diagnosis start screen on the display portion 4e by using the received web screen data. In other words, it may be possible that the worker views the diagnosis start screen displayed on the communication terminal 4 for confirmation purposes, understands instructions for starting a diagnosis, and proceeds to the next process.

When the worker confirms a start of a diagnosis, the server 2 starts the diagnosis (C6) and transmits a vehicle information request from the communication AP server 8 to the communication terminal 4 through the M2M server 3 (C7). When the wide-area wireless communication portion 4c receives the vehicle information request transmitted from the server 2 (B6), the communication terminal 4 subjects the received vehicle information request to command conversion and transmits the resulting vehicle information request to the vehicle 9 through the connection cable 10 (B7). Upon receipt of the vehicle information request transmitted from the communication terminal 4 (A3), the vehicle 9 analyzes the received vehicle information request and transmits vehicle information designated by the received vehicle information request to the communication terminal 4 through the connection cable 10 (A4). When, for example, an engine speed is designated by the vehicle information request, the vehicle 9 transmits vehicle information including the engine speed to the communication terminal 4.

When the diagnosis starts and the server 2 causes the communication AP server 8 to transmit the vehicle information request to the communication terminal 4 through the M2M server 3, the server 2 selects an operation instruction screen from web screens stored in the web screen storage portion 6e and provides the selected operation instruction screen (C8). When the server 2 provides the operation instruction screen, the function of the web browser enables the communication terminal 4 to receive web screen data providing the operation instruction screen from the server 2. And the communication terminal 4 displays the operation instruction screen on the display portion 4e by using the received web screen data. In other words, it may be possible that the worker views the operation instruction screen displayed on the communication terminal 4 for confirmation purposes, understands instructions including an IG turn-on, an engine startup, an idling, a racing, a full-throttle racing, and other diagnostic steps described later with reference to FIG. 6, and proceeds to the next process.

When the worker changes the vehicle status according to instructions displayed on the operation instruction screen, updated vehicle information reflecting such vehicle status changes is transmitted from the vehicle 9 to the server 2 through the communication terminal 4. When, for example, the worker operates the accelerator pedal 12b according to an instruction operating (depressing) the accelerator pedal 12b, which is displayed on the operation instruction screen, data indicative of an engine speed matching the amount of operation of the accelerator pedal 12b is transmitted from the vehicle 9 to the server 2 through the communication terminal 4. Upon receipt of the vehicle information transmitted from the vehicle 9 (B8), the communication terminal 4 performs the command conversion to the received vehicle information and transmits the resulting vehicle information from the wide-area wireless communication portion 4c to the server 2 through the M2M server 3 (B9). When the communication AP server 8 receives the vehicle information transmitted from the communication terminal 4 (C9), the server 2 analyzes the received vehicle information (010) and determines whether it is necessary to reacquire vehicle information (C11).

When it is determined that all vehicle information required for producing diagnosis results prescribed by a diagnosis procedure is acquired, and that the vehicle information is properly acquired (for example, the acquired vehicle information is acquired by allowing the worker to perform a correct procedure or the acquired vehicle information meets predetermined conditions), the server 2 determines that vehicle information need not be reacquired.

When it is determined that all vehicle information required for producing diagnosis results is not acquired, or that the vehicle information is improperly acquired (for example, the acquired vehicle information is acquired by allowing the worker to perform an incorrect procedure or the acquired vehicle information does not meet the predefined conditions), the server 2 determines that vehicle information needs to be reacquired. When, for example, the worker acquires an engine speed by operating the accelerator pedal 12b by an amount exceeding the amount of operation specified by the server 2, the server 2 determines that vehicle information needs to be reacquired since the accelerator pedal 12b is improperly operated by the worker.

When the server 2 determines that vehicle information needs to be reacquired (C11: YES), the server 2 transmits a vehicle information request from the communication AP server 8 to the communication terminal 4 through the M2M server 3 in order to reacquire the vehicle information (C12), and repeats the same processing steps (C13, C14). In response to the processing steps performed by the server 2, the communication terminal 4 and the vehicle 9 repeat the same processing steps (B10 to B13, A5, A6).

In other words, when it is determined that vehicle information needs to be reacquired, the server 2 provides an operation instruction screen including instructions for reacquiring the vehicle information and repeats the same processing steps until it is determined that the reacquisition of vehicle information is not needed.

When it is determined that the reacquisition of vehicle information is not needed (C11: NO), the server 2 produces diagnosis results on the basis of previously acquired vehicle information (C15), and then terminates the diagnosis (C16).

The server 2 selects a frame (a template) for a diagnosis result screen from web screens stored in the web screen storage portion 6e and provides the diagnosis result screen that is organized by describing the obtained diagnosis results in this time within the frame (C17). When the server 2 provides the diagnosis result screen, the function of the web browser enables the communication terminal 4 to receive web screen data for the diagnosis result screen from the server 2 and to display the diagnosis result screen on the display portion 4e by using the received web screen data. In other words, it may be possible that the worker views the diagnosis result screen displayed on the communication terminal 4 for confirmation purposes and understands the diagnosis results.

Figure 6:
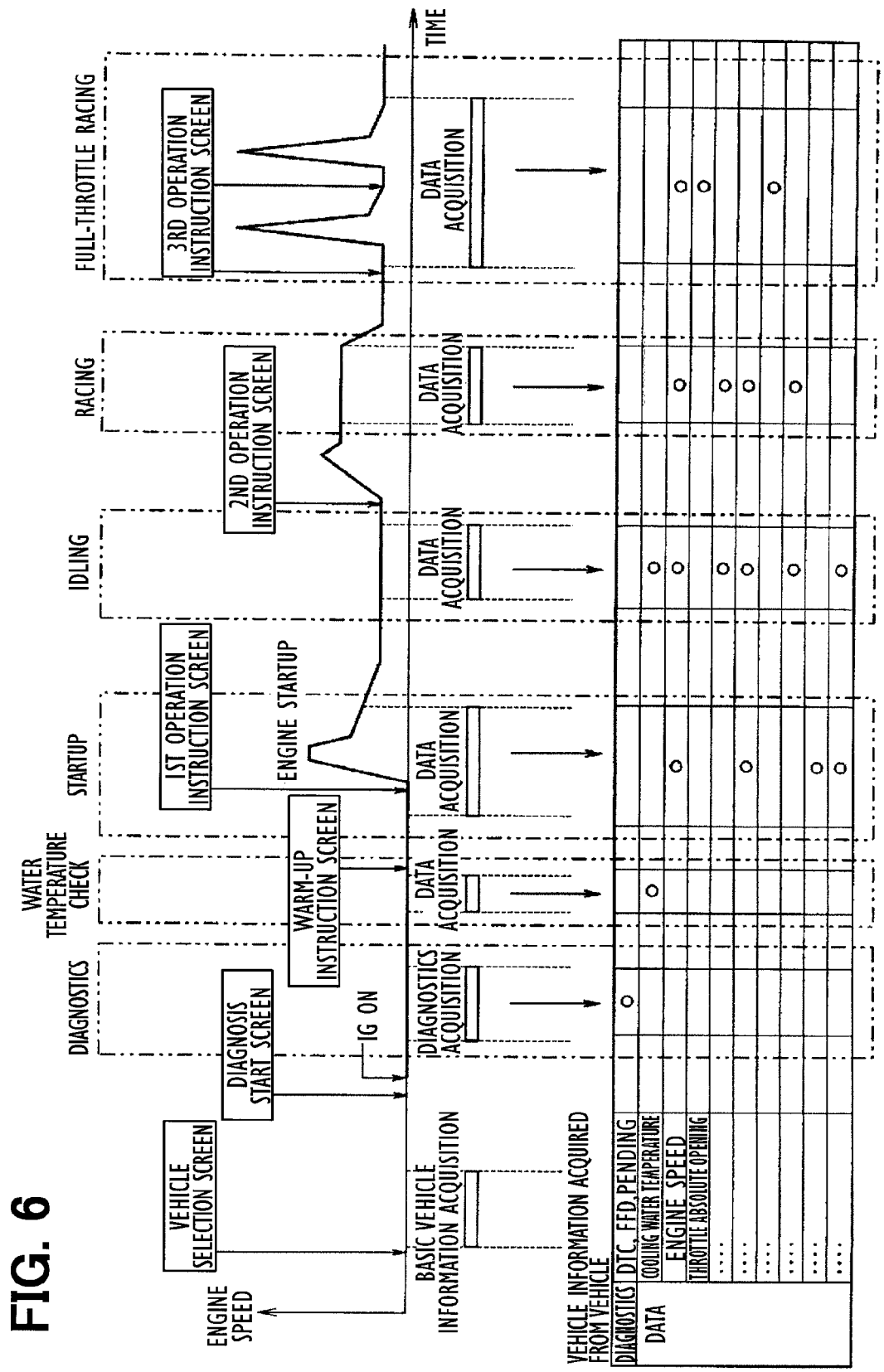
FIG. 6 is a diagram illustrating engine speed transitions, screen transitions, and vehicle information acquired from a vehicle.
Figure 7:
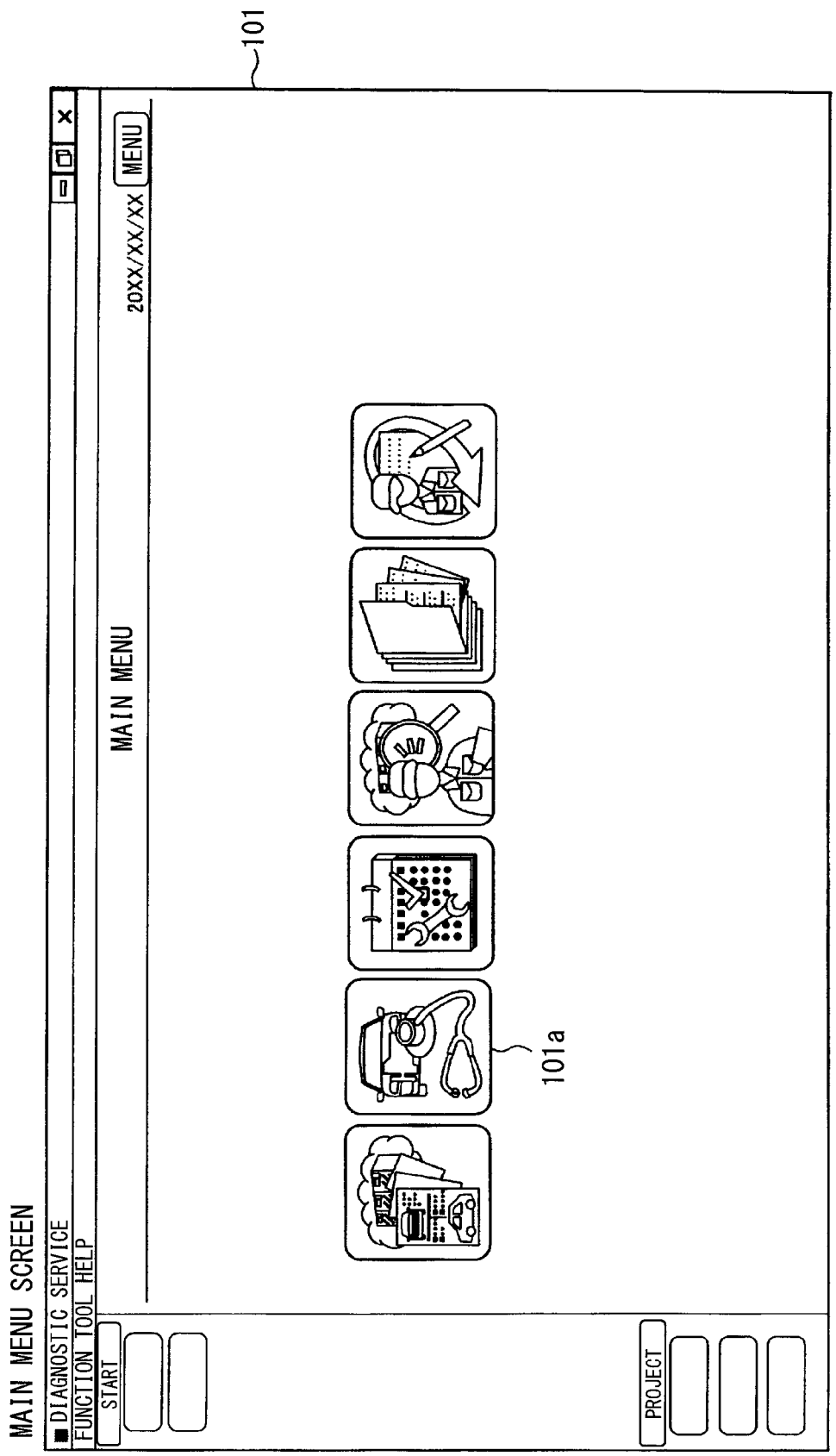
FIG. 7 is a diagram illustrating a main menu screen.

A specific example of the processing sequence will be described with referring to FIG. 6 to FIG. 19. The present embodiment describes a case where the server 2 diagnoses an engine (drive mechanism) as illustrated in FIG. 6. When the worker presses a "Diagnosis" icon 101a while a main menu screen 101 is displayed on the communication terminal 4 as illustrated in FIG. 7, the communication terminal 4 transmits to the server 2 an operation signal indicating that the "Diagnosis" icon 101a is pressed by the worker. Pressing an icon may be an example of an operation performed to make a selection.

Figure 8:
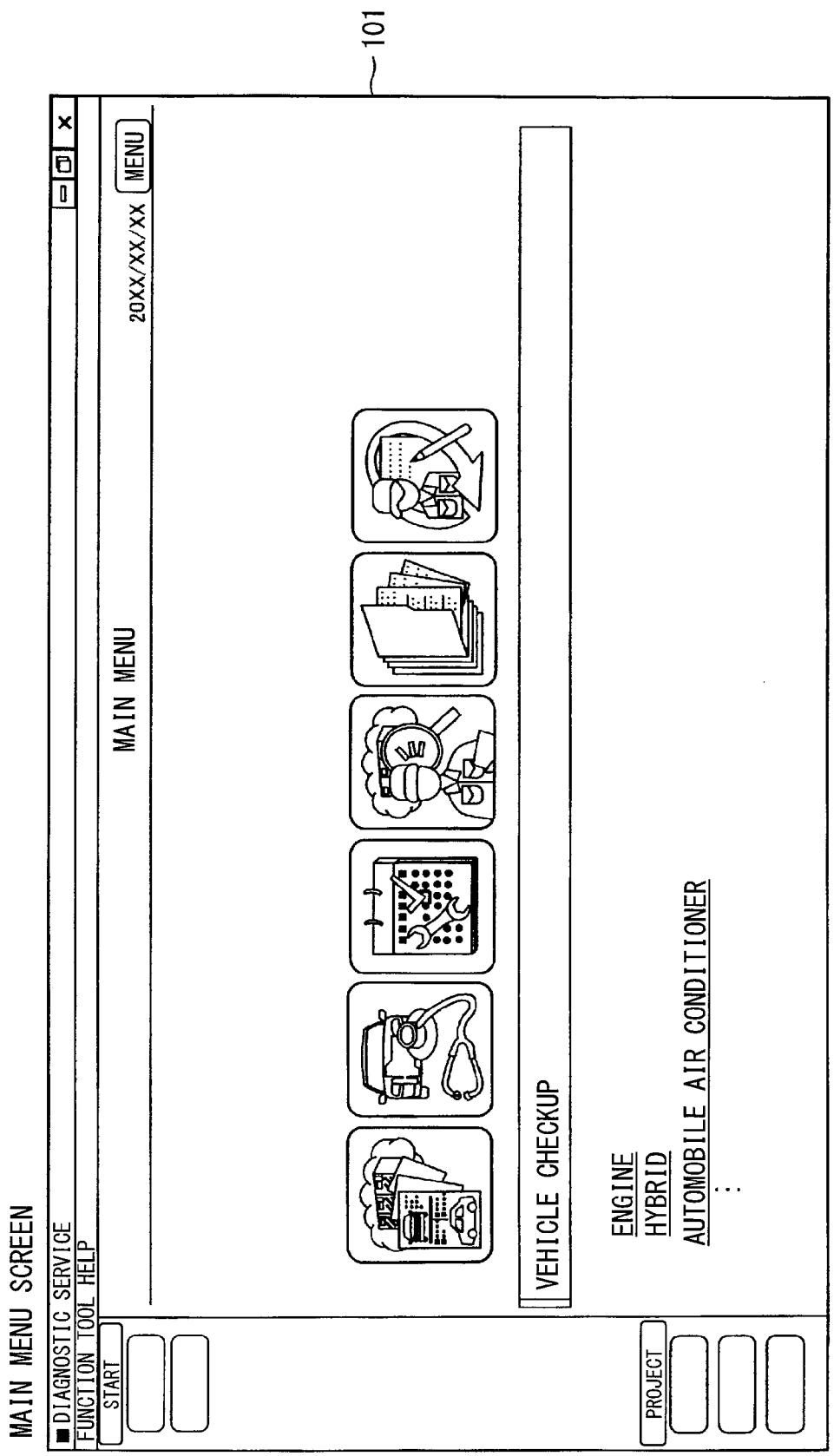
FIG. 8 is a diagram illustrating a main menu screen.

Upon receipt of the operation signal transmitted from the communication terminal 4, the server 2 transmits web screen data to the communication terminal 4. Upon receipt of the web screen data from the server 2, the communication terminal 4 selectably displays diagnosis targets such as "Engine", "Hybrid", and "Automobile air conditioner" on the main menu screen 101 as illustrated in FIG. 8. When, for example, the worker selects "Engine" as a diagnosis target, the communication terminal 4 transmits to the server 2 an operation signal indicating that "Engine" is selected as a diagnosis target by the worker.

Figure 9:
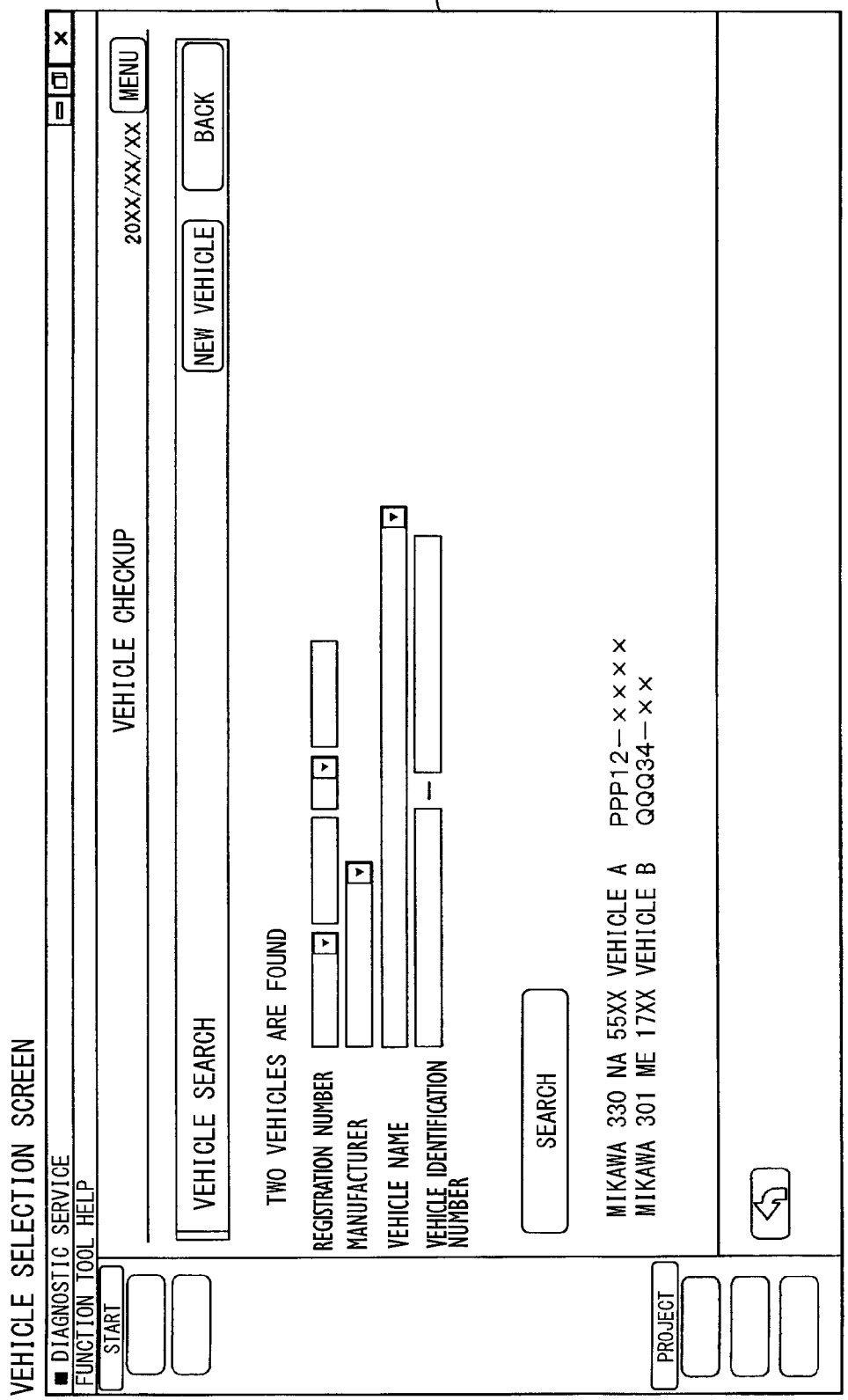
FIG. 9 is a diagram illustrating a vehicle selection screen.

Upon receipt of the operation signal transmitted from the communication terminal 4, the server 2 transmits web screen data for a vehicle selection screen 102 to the communication terminal 4. Upon receipt of the web screen data from the server 2, the communication terminal 4 displays the vehicle selection screen 102 as illustrated in FIG. 9 by using the received web screen data. When the worker selects a vehicle 9 as a diagnosis target, the communication terminal 4 transmits to the server 2 an operation signal indicating that the vehicle 9 is selected as a diagnosis target by the worker. In FIG. 9, for example, "Vehicle A" is a vehicle name, "PPP12-xxxx" is an example of a vehicle identification number, and "Mikawa 330 NA 55xx" is an example of a registered vehicle identification number plate.

Figure 10:
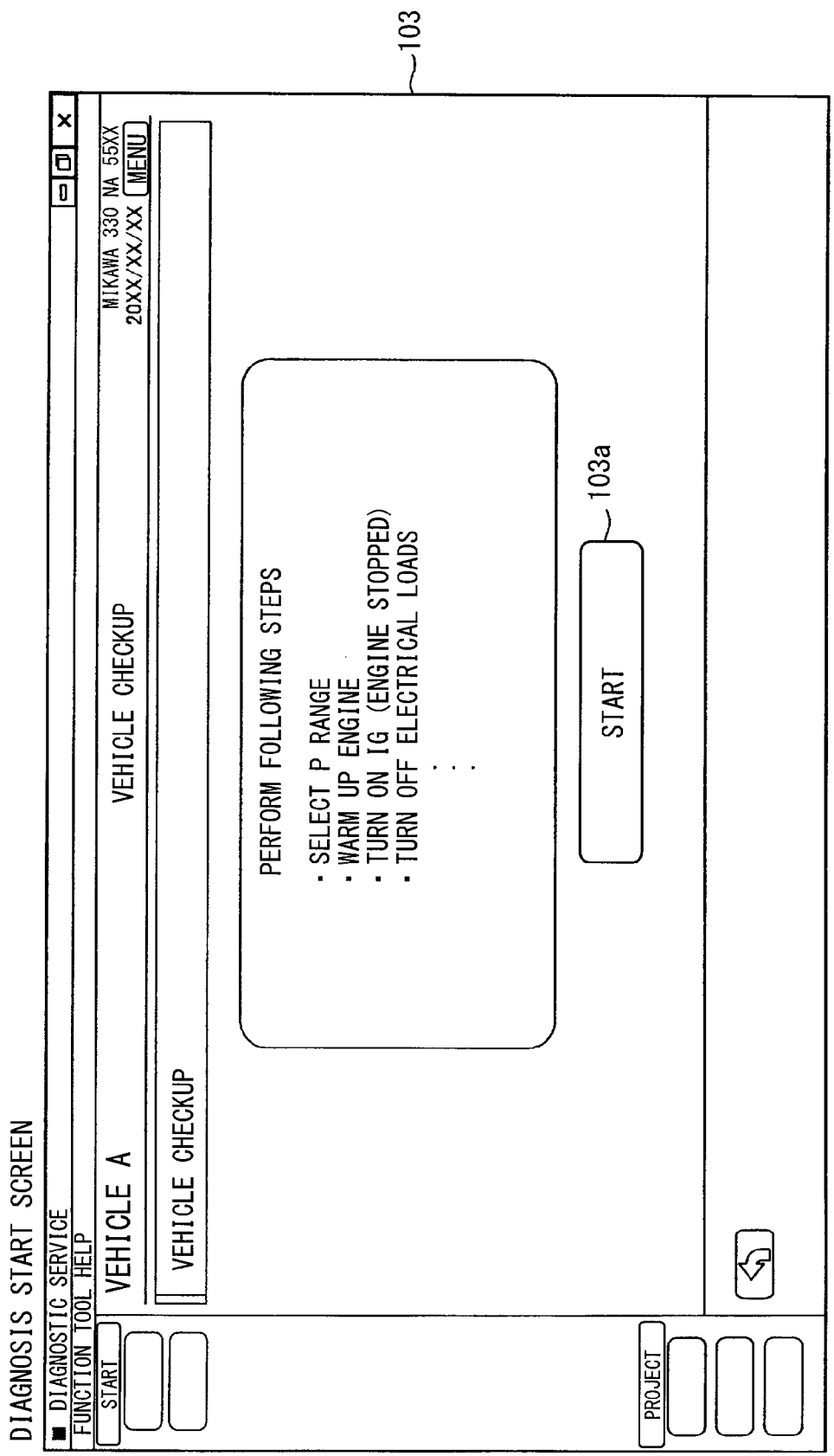
FIG. 10 is a diagram illustrating a diagnosis start screen.

Upon receipt of the operation signal transmitted from the communication terminal 4, the server 2 transmits web screen data for a diagnosis start screen 103 to the communication terminal 4. Upon receipt of the web screen data from the server 2, the communication terminal 4 displays the diagnosis start screen 103 as illustrated in FIG. 10 by using the received web screen data. When the worker views the diagnosis start screen 103 for confirmation purposes, the worker understands that, for example, "Select P range", "Warm up engine", "Turn on IG (engine stopped)", and "Turn off electrical loads" are instructions for starting a diagnosis. When the worker presses a start button 103a, the communication terminal 4 transmits to the server 2 an operation indicating that the start button 103a is pressed by the worker.

Figure 11:
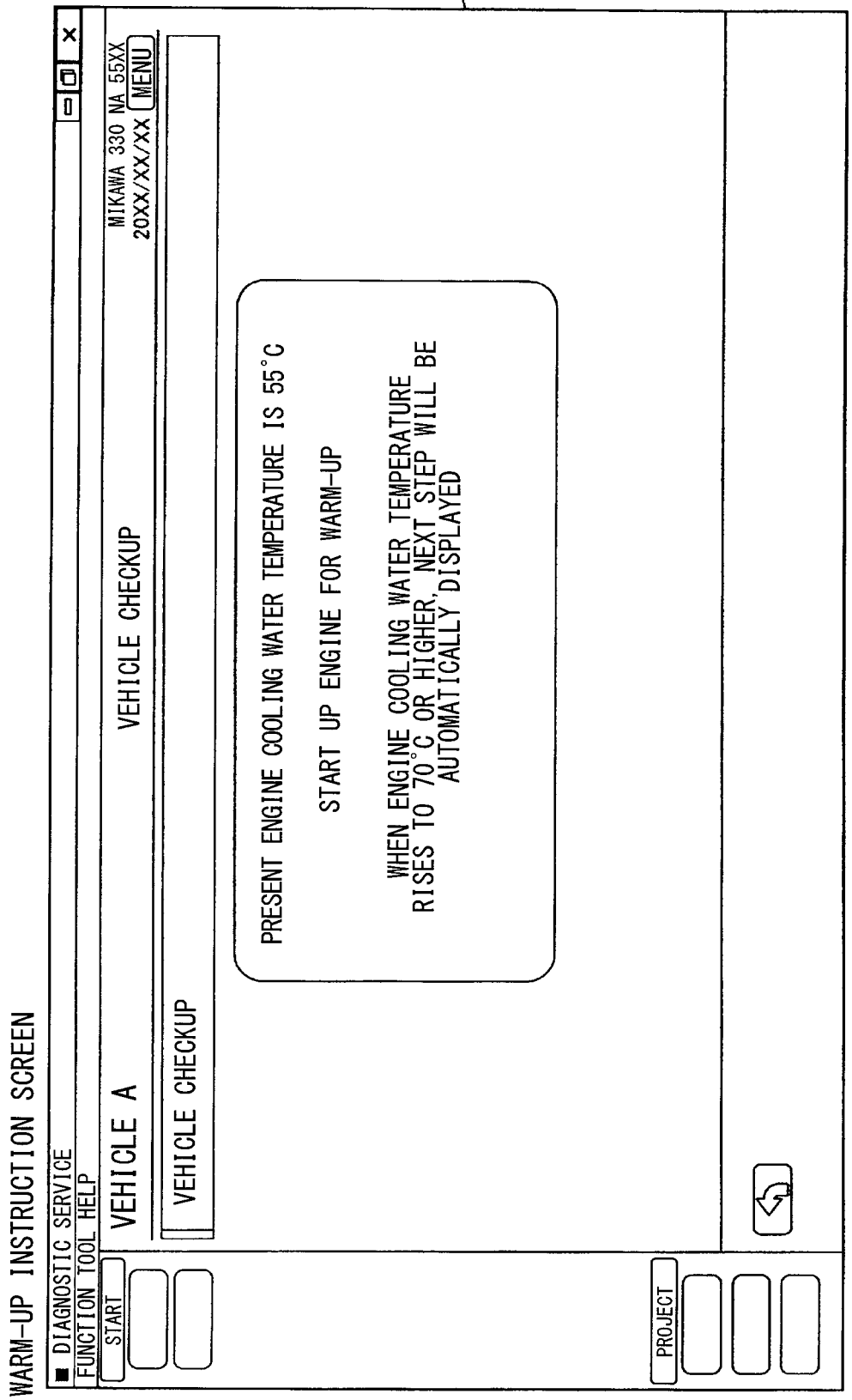
FIG. 11 is a diagram illustrating a warm-up instruction screen.

Upon receipt of the operation signal transmitted from the communication terminal 4, the server 2 transmits to the communication terminal 4 a vehicle information request for acquiring data indicative of a present temperature of engine cooling water (engine water temperature). Upon receipt of vehicle information including the data indicative of the present temperature of the engine cooling water from the communication terminal 4, the server 2 determines whether the present temperature of engine cooling water reaches a predetermined temperature. When it is determined that the present temperature of engine cooling water does not reach the predetermined temperature, the server 2 transmits web screen data for a warm-up instruction screen 104 to the communication terminal 4. Upon receipt of the web screen data from the server 2, the communication terminal 4 displays the warm-up instruction screen 104 as illustrated in FIG. 11 by using the received web screen data. When the worker views the warm-up instruction screen 104 for confirmation purposes, the worker understands the present temperature of engine cooling water (a temperature of 55° C. is indicated as an example in FIG. 11). The worker also understands that the engine needs to be warmed up since the present temperature of engine cooling water does not reach the predetermined temperature (a temperature of 70° C. is indicated as an example in FIG. 11), and that the next step to be performed will be automatically displayed when the temperature of the engine cooling water reaches the predetermined temperature. When it is determined that the temperature of engine cooling water reaches the predetermined temperature, the server 2 does not transmit the web screen data for the warm-up instruction screen 104, and the communication terminal 4 does not display the warm-up instruction screen 104.

Figure 12:
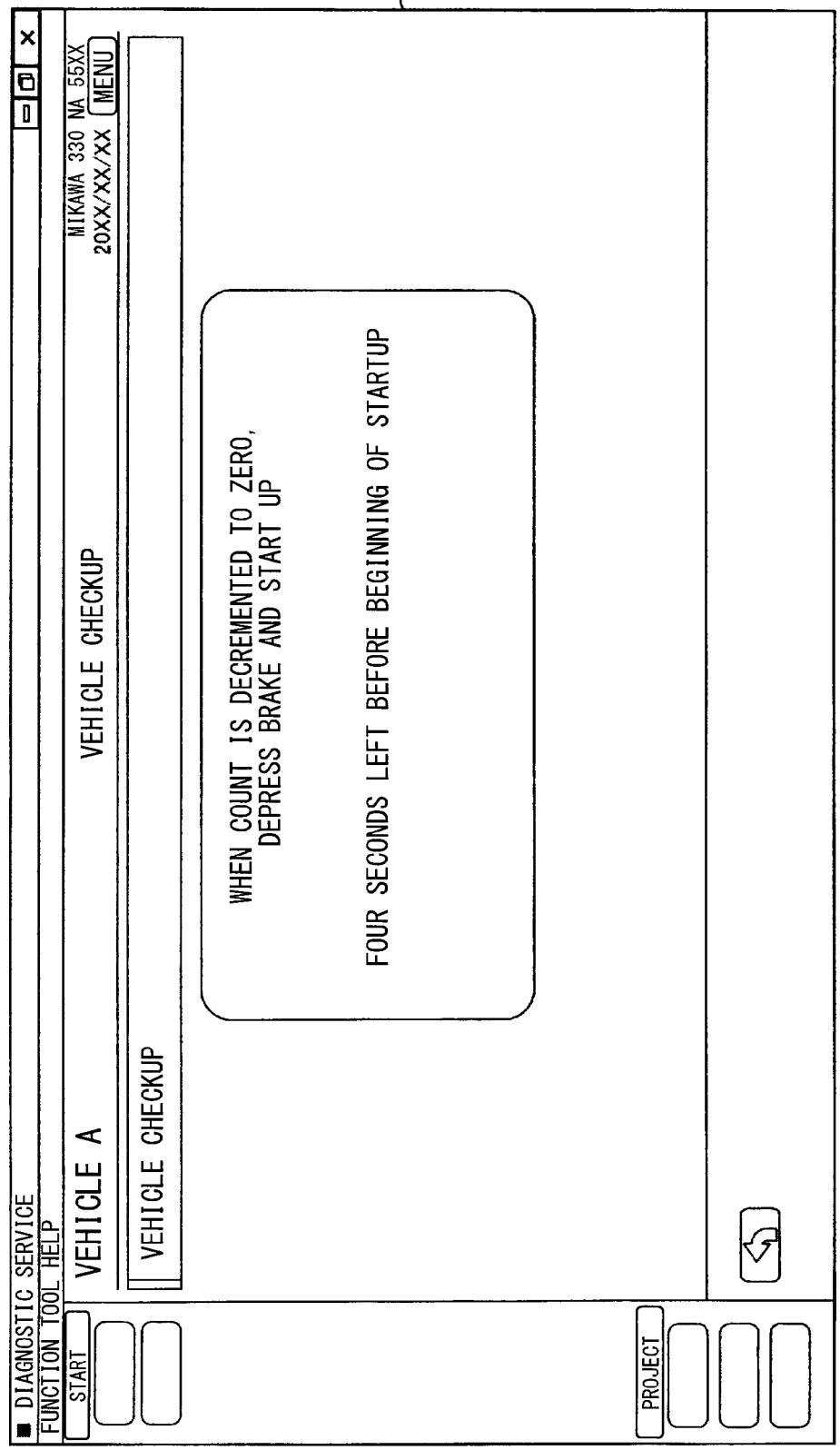
FIG. 12 is a diagram illustrating a first operation instruction screen.

The server 2 monitors whether the temperature of engine cooling water reaches the predetermined temperature. When it is determined that the temperature of engine cooling water reaches the predetermined temperature, the server 2 transmits web screen data for a first operation instruction screen 105 to the communication terminal 4. Upon receipt of the web screen data from the server 2, the communication terminal 4 displays the first operation instruction screen 105 as illustrated in FIG. 12 by using the received web screen data. When the worker views the first operation instruction screen 105 for confirmation purposes, the worker understands that the next step is to depress a brake and start up the engine, and knows the time at which the engine should be started up with the brake depressed.

When the server 2 provides the first operation instruction screen 105 to prompt the worker to depress the brake and start up the engine, the server 2 performs a countdown to the time at which the worker should initiate a startup sequence. In other words, a route through which the basic vehicle information and vehicle information are transmitted from the communication terminal 4 and received by the server 2 is different from a route through which the web screen data is transmitted from the server 2 and received by the communication terminal 4. Therefore, when the communication terminal 4 transmits data related to the initiation of the startup sequence while the server 2 is not completely ready to receive the data related to the initiation of the startup sequence from the communication terminal 4, the server 2 may be unable to receive the data. In view of such cases, the first operation instruction screen 105 adjusts the time (for synchronization purposes) at which the worker initiates the startup sequence so that the worker initiates the startup sequence after the server 2 is completely ready to receive the data related to the initiation of the startup sequence from the communication terminal 4. The time at which the worker should initiate the startup sequence may be indicated by a countdown or adjusted by changing the time of displaying the first operation instruction screen 105. As for a second operation instruction screen 106 and a third operation instruction screen 107, the time at which the worker should initiate an operation is also adjusted in the similar manner as described above.

Figure 13:
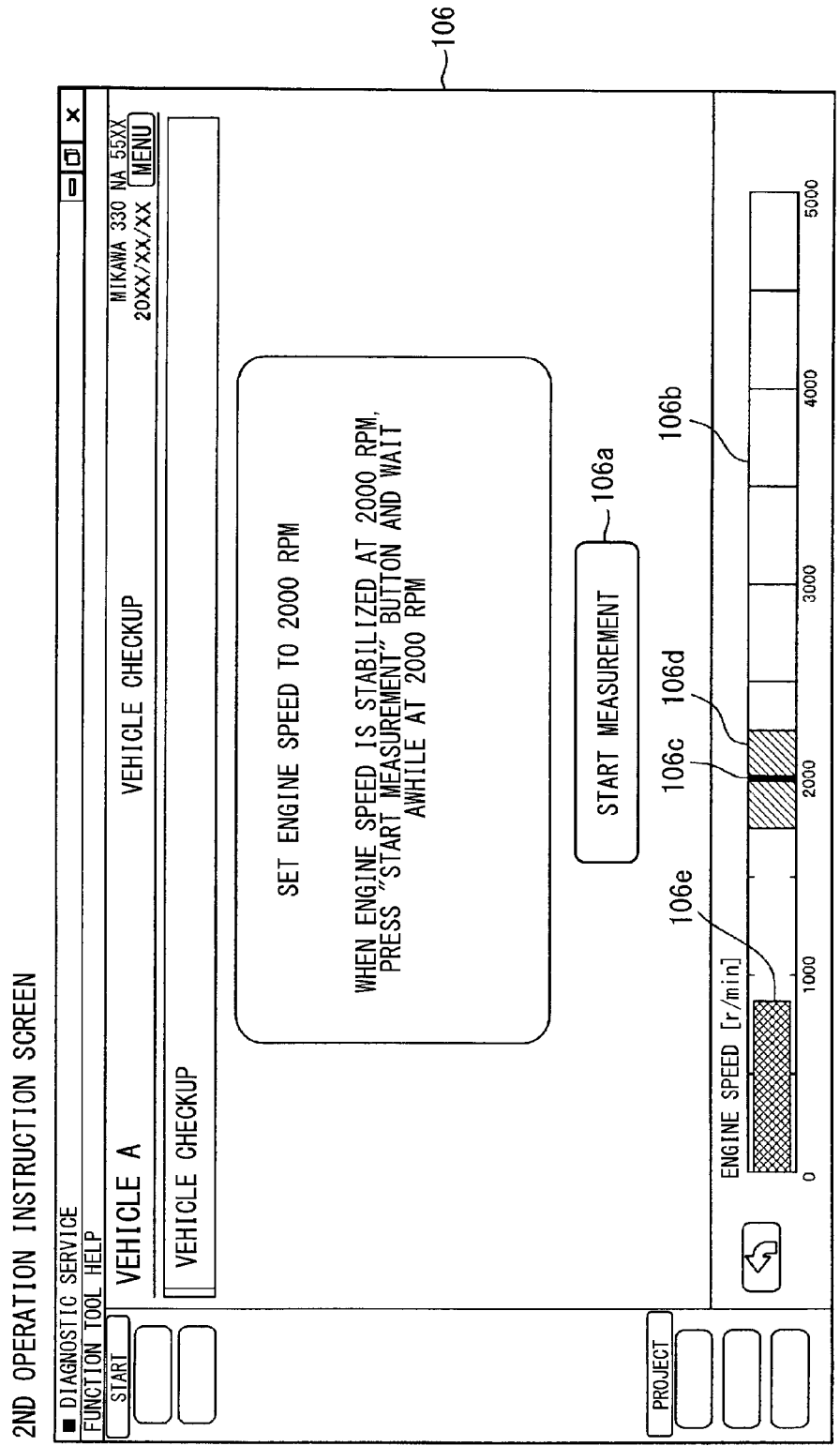
FIG. 13 is a diagram illustrating a part of a second operation instruction screen.

The server 2 monitors whether the startup sequence is initiated by the worker with the brake depressed. When it is determined that the startup sequence is initiated by the worker with the brake depressed, the server 2 transmits web screen data for the second operation instruction screen 106 to the communication terminal 4. Upon receipt of the web screen data from the server 2, the communication terminal 4 displays the second operation instruction screen 106 as illustrated in FIG. 13 by using the received web screen data. When the worker views the second operation instruction screen 106 for confirmation purposes, the worker can understand that the next step is to increase the engine speed to a predetermined speed (an engine speed of 2000 rpm is indicated as an example in FIG. 13) (by performing a procedure for varying the status of a drive mechanism) and maintain the predetermined engine speed.

In the present embodiment, the second operation instruction screen 106 shows an instruction for increasing the engine speed to the predetermined speed. Therefore, the second operation instruction screen 106 presents various information, namely, a scale 106*b*, a target line 106*c*, a target area 106*d*, and a bar 106*e*, to permit the worker to confirm the engine speed. The scale 106*b* indicates a range of engine speeds (an engine speed range of 0 to 5000 rpm is indicated as an example in FIG. 13). The target line 106*c* indicates a target. The target area 106*d* indicates a target area on either side of the target line 106*c*. The bar 106*e* indicates the engine speed. The scale 106*b*, the target line 106*c*, the target area 106*d*, and the bar 106*e* are displayed in different colors.

Figure 14:
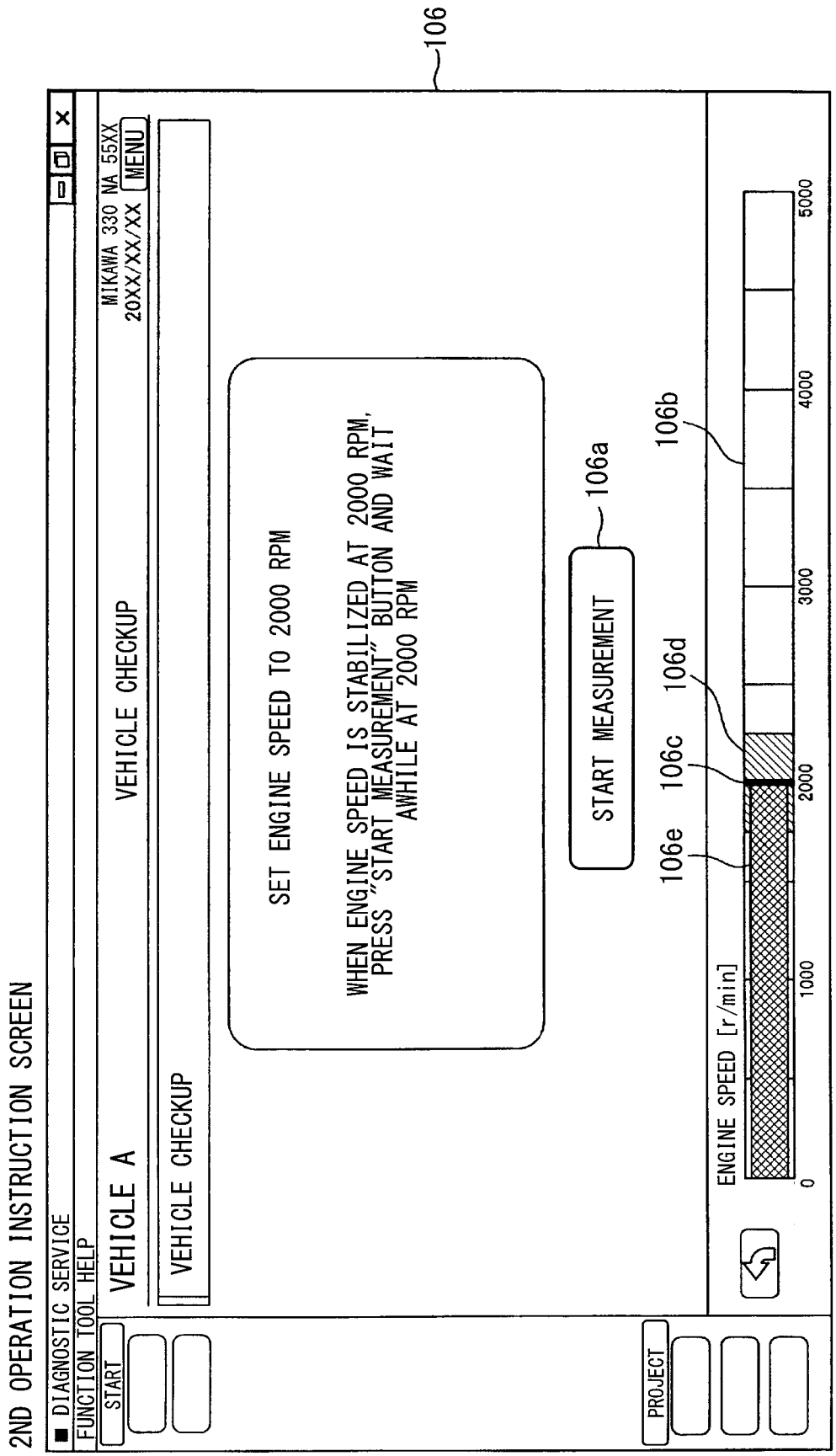
FIG. 14 is a diagram illustrating a part of the second operation instruction screen.

When the worker operates (depresses) the accelerator pedal 12*b*, vehicle information including an engine speed matching the amount of operation of the accelerator pedal 12*b* is transmitted from the vehicle 9 to the server 2 through the communication terminal 4 and the M2M server 3. The vehicle information corresponds to vehicle information reflecting work that changes a status of a drive mechanism that the worker performed to the vehicle, or vehicle information showing the status of the drive mechanism corresponding to the work changing the status of the drive mechanism performed by the worker. The engine speed is then reflected in the second operation instruction screen 106. More specifically, as illustrated in FIG. 14, the bar 106*e* displayed on the second operation instruction screen 106 to indicate the engine speed expands or contracts on the basis of the worker's operation of the accelerator pedal 12*b*. In this instance, the time at which the second operation instruction screen 106 is displayed is adjusted to ensure that the worker operates the accelerator pedal 12*b* after the server 2 becomes completely ready to receive data indicative of the engine speed. Thus, the bar 106*e* displayed on the second operation instruction screen 106 to indicate the engine speed expands or contracts in response to the worker's operation of the accelerator pedal 12*b*. In other words, the worker is prevented from having a feeling of discomfort by avoiding a situation where the bar 106*e* does not expand or contract when the worker operates the accelerator pedal 12*b* or expands or contracts with a delay after the worker's operation of the accelerator pedal 12*b*.

The bar 106*e* expands or contracts on the basis of the amount by which the worker operates the accelerator pedal 12*b*. Therefore, even when a tachometer (a meter indicative of an engine speed) is not incorporated in the vehicle 9 to be diagnosed, the worker confirms the engine speed by viewing the second operation instruction screen 106 for confirmation purposes. Further, since the second operation instruction screen 106 is provided in the form of a web screen, the resolution (calibrations) of the scale 106b may be set as desired. Thus, even when a tachometer is not incorporated in the vehicle 9 to be diagnosed, it may be possible that the engine speed is fine-tuned easily when the second operation instruction screen 106 is viewed for confirmation purposes while the resolution of the scale 106b is set to be higher than the resolution of a tachometer. When the worker presses a measurement start button 106a, the communication terminal 4 transmits to the server 2 an operation signal indicating that the measurement start button 106a is pressed by the worker.

Figure 15:
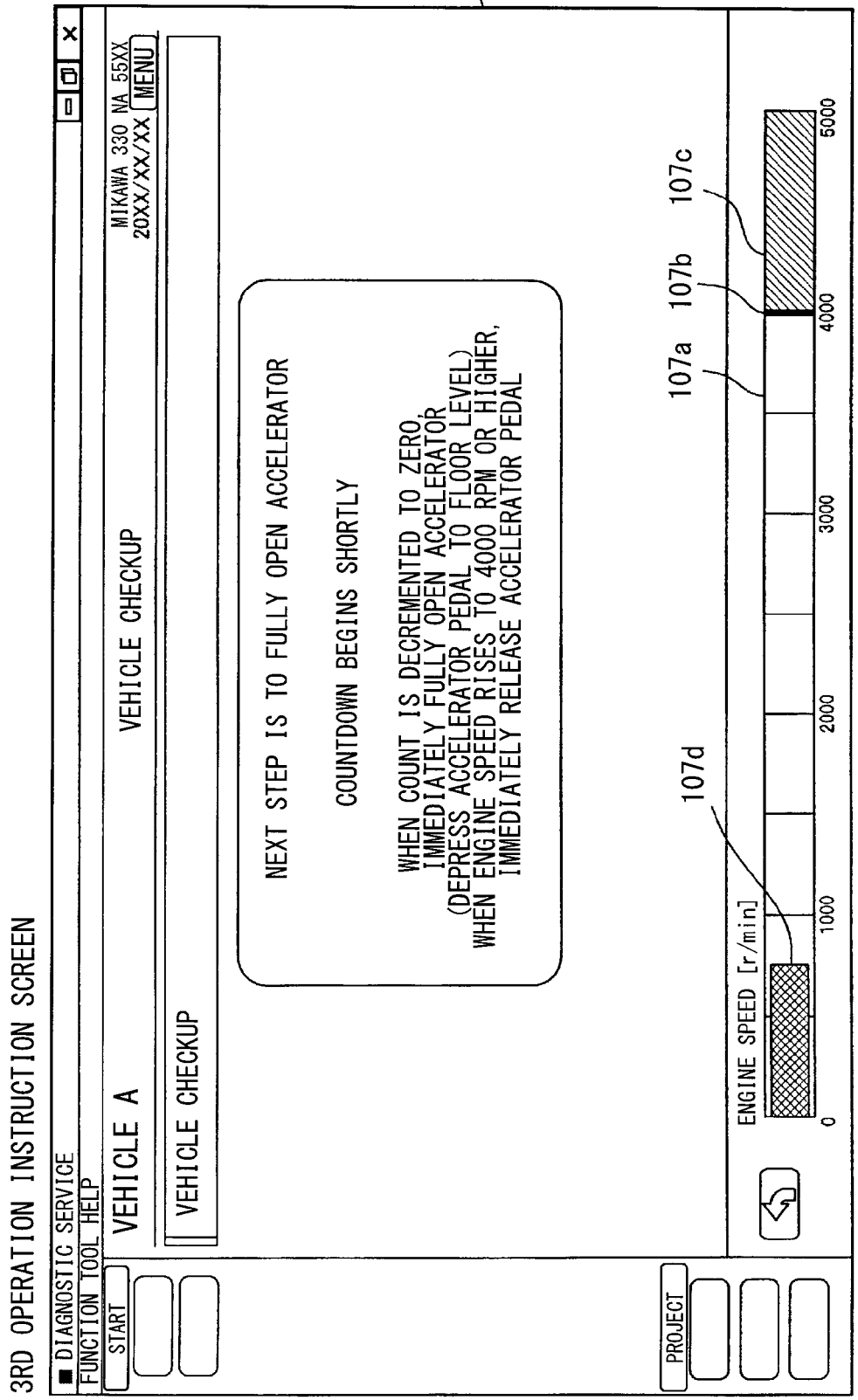
FIG. 15 is a diagram illustrating a third operation instruction screen.

Upon receipt of the operation signal transmitted from the communication terminal 4, the server 2 transmits web screen data for the third operation instruction screen 107 to the communication terminal 4. Upon receipt of the web screen data from the server 2, the communication terminal 4 displays the third operation instruction screen 107 as illustrated in FIG. 15 by using the received web screen data. When the worker views the third operation instruction screen 107 for confirmation purposes, the worker can understand that the next step is to fully open an accelerator. Fully opening the accelerator is depressing the accelerator pedal 12b to the maximum extent. The third operation instruction screen 107 also shows a scale 107a, a target line 107b, a target area 107c, and a bar 107d in order to permit the worker to confirm the engine speed.

Figure 16:
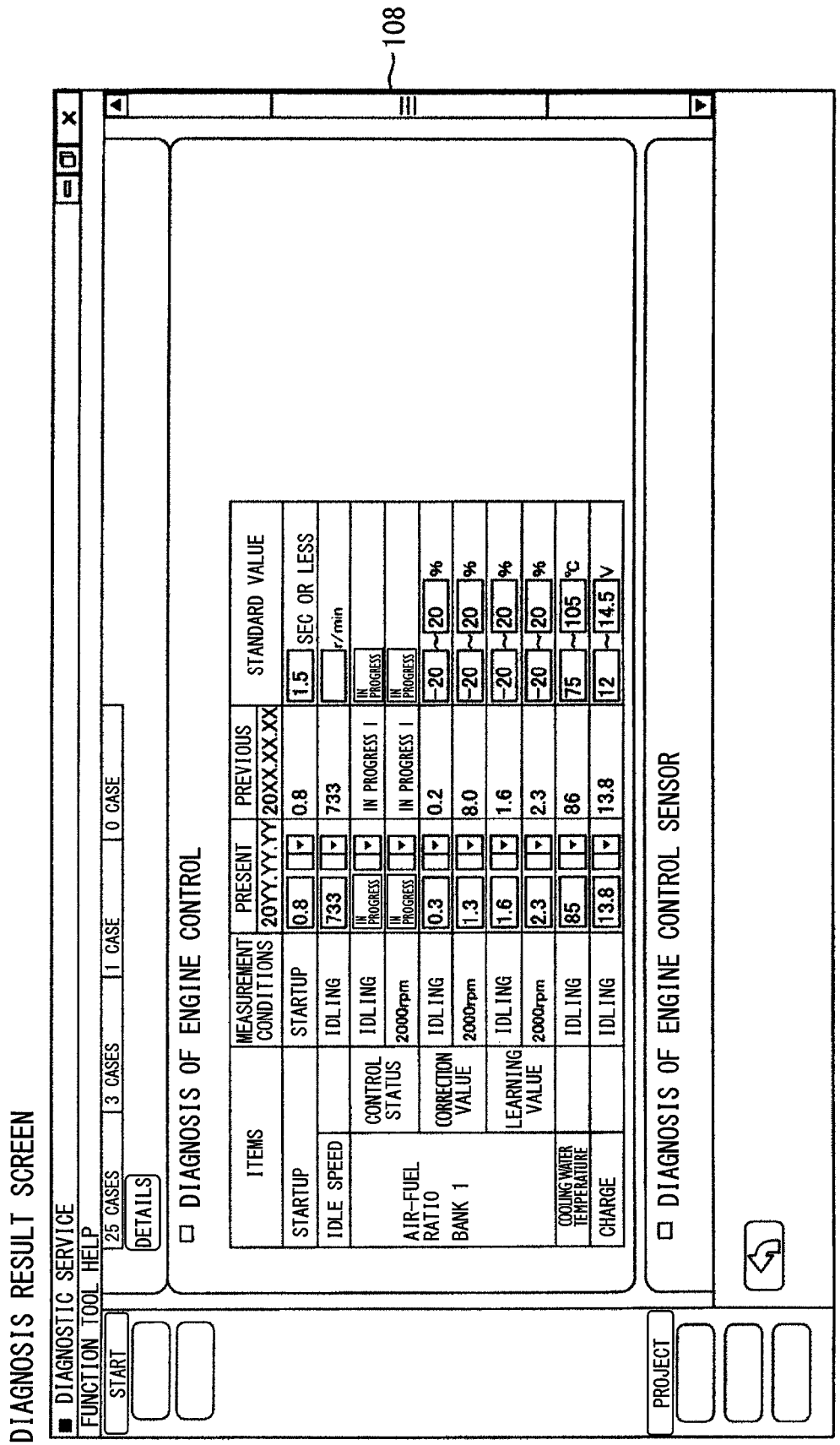
FIG. 16 is a diagram illustrating a part of a diagnosis result screen.
Figure 18:
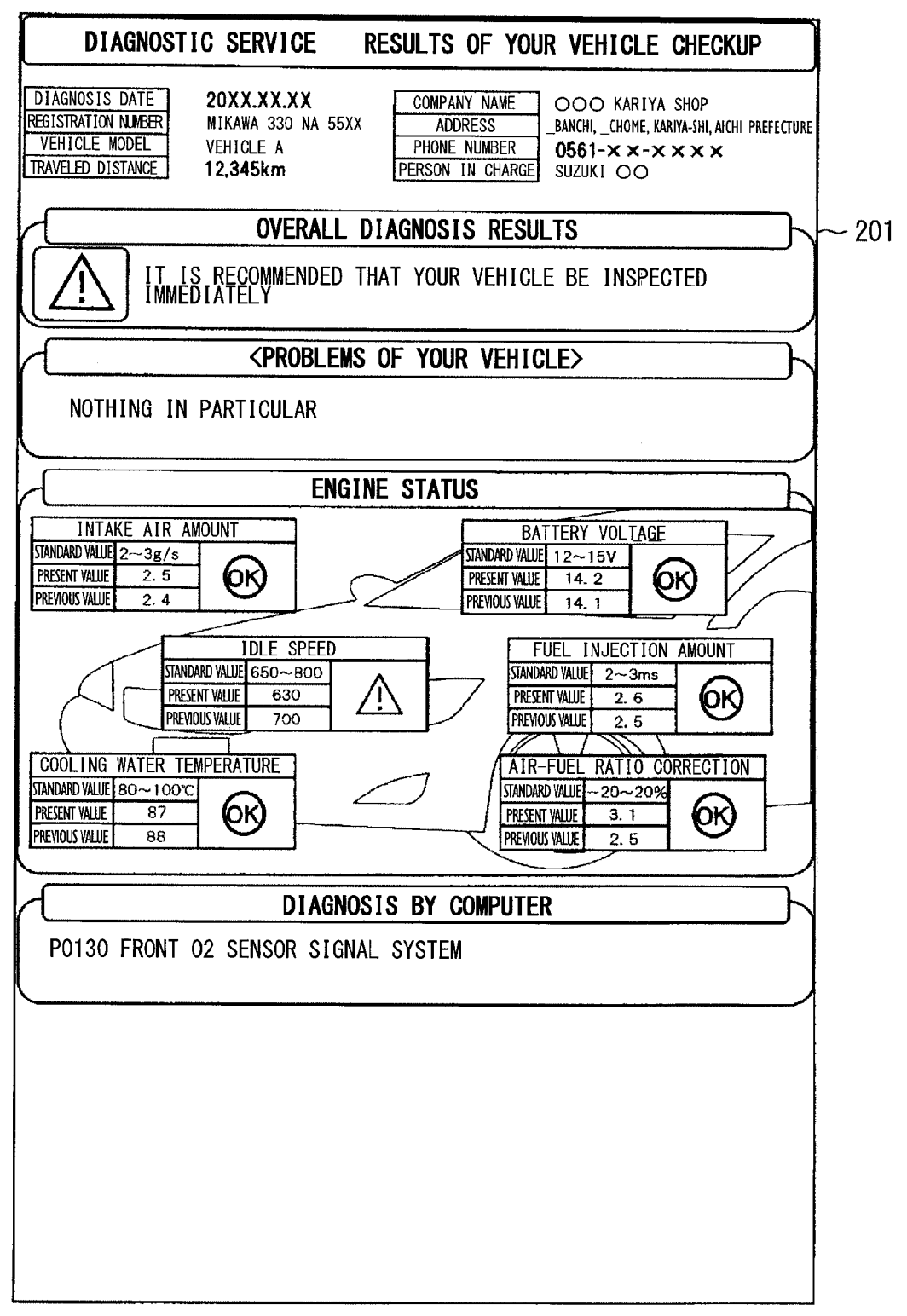

When the worker performs a series of diagnostic checks and generates diagnosis results according to the sequentially (chronologically) displayed operation instruction screens, the server 2 transmits the web screen data for the diagnosis result screen 108 to the communication terminal 4. Upon receipt of the web screen data from the server 2, the communication terminal 4 displays the diagnosis result screen 108 as illustrated in FIG. 16 by using the received web screen data. When the worker views the diagnosis result screen 108 for confirmation purposes, the worker understands diagnosis results obtained from the series of diagnostic checks. As illustrated in FIG. 17, the diagnosis result screen 108 displayed on the communication terminal 4 is scrollable. As illustrated in FIG. 18, the communication terminal 4 may also print out the diagnosis results on a form 201 of a predetermined size.

As described above, in the vehicle diagnosis system 1 according to the first embodiment, a web screen including instructions for a worker who diagnoses a vehicle is provided from the server 2 to the communication terminal 4 through the Internet 5. It may be possible that the worker handing the communication terminal 4 views a web screen displayed on the communication terminal 4 for confirmation purposes, understands instructions for the worker, and diagnoses the vehicle 9 according to the instructions. Even when the instructions are complicated as they describe, for example, multiple procedures for changing the status of the vehicle from moment to moment, the server 2 sequentially updates the web screen as needed, and it may be possible to properly give the complicated instructions to the worker.

Since the instructions for the worker are provided by using web screens, it may be possible to avoid an increase in the burden placed on the communication terminal 4 without requiring a large-capacity storage portion for the communication terminal 4 and complicated maintenance for software. Furthermore, it may be possible to create various web screens that properly handle a wide variety of characteristics of the vehicle 9 (for example, vehicle models, engine types, drive methods (2WD/4WD), and transmissions). This eliminates the necessity of preparing multiple communication terminals 4 for different characteristics of the vehicle 9. Moreover, any communication terminal 4 may be used as far as it is capable of displaying a web screen (handling a web browser). A general communication terminal 4 may be used. This requirement can be easily met.

Second Embodiment

A second embodiment of the present disclosure will be described with reference to FIG. 19. The first embodiment is configured so that the communication terminal 4 is directly connected to a vehicle to let the communication terminal 4 acquire vehicle information directly from the vehicle. In the second embodiment, the communication terminal is connected to the vehicle through a dedicated vehicle connection terminal and the communication terminal 4 acquires vehicle information from the vehicle through the vehicle connection terminal.

The vehicle connection terminal 21 includes a control portion 21a, a connector 21b, a command conversion portion 4d, and a BT communication portion 21d. The control portion 21a controls the overall operation of the vehicle connection terminal 21. The connector 21b and the command conversion portion 21c respectively correspond to the connector 4b and the command conversion portion 4d, which are described in the first embodiment. The BT communication portion 21d establishes Bluetooth (registered trademark) communication with a communication terminal 22. The communication terminal 22 includes a control portion 22a, a BT communication portion 22b, a wide-area wireless communication portion 22c, a display portion 22d, an operation reception portion 22e, and a storage portion 22f. The control portion 22a controls the overall operation of the communication terminal 22. The BT communication portion 22b establishes Bluetooth communication with the vehicle connection terminal 21. The wide-area wireless communication portion 22c, the display portion 22d, the operation reception portion 22e, and the storage portion 22f respectively correspond to the wide-area wireless communication portion 4c, the display portion 4e, the operation reception portion 4f, and the storage portion 4g, which are described in the first embodiment. The vehicle connection terminal 21 and the communication terminal 22 need not always be connected through Bluetooth, but may be connected through a different wireless communication method (for example, wireless LAN). Alternatively, the vehicle connection terminal 21 may be wire-connected to the communication terminal 22. Even when the functions of the communication terminal 4 described in the first embodiment are divided and allocated to the vehicle connection terminal 21 and the communication terminal 22 as described above, the second embodiment provides the same operational advantages as the first embodiment.

Other Embodiments

The present disclosure is not limited to the above embodiments. The above embodiments may be modified or extended as described below, for example.

The present disclosure need not always be applied to the diagnosis of an engine, but may be applied to the diagnosis of another mechanism such as an automobile air conditioner.

The engine need not always be diagnosed by following a sequence of diagnostics, startup, idling, racing, and full-throttle racing, but may be diagnosed in a divided manner by performing, for example, diagnostics only, engine startup only, or idling only. Another alternative is to make a diagnosis by combining two or more diagnostic steps such as engine startup and idling.

Instructions that are displayed on a web screen and provided to the worker may be in the form of text or in the form of a combination of text and image. Both still images and moving images may be used. Further, an audio output, for example, may be generated in coordination with an image. When instructions are provided in the form of a combination of text and image, it can be expected that the instructions will be more accurately given to the worker. Inside the vehicle 9, the first to fourth control portions 11a to 14a need not always be connected to the connector 9a through a CAN (controller area network), but may be connected to the connector 9a through a different communication network such as an in-vehicle Ethernet (registered trademark) network or a FlexRay (registered trademark) network.

According to the present disclosure, a communication terminal transmits vehicle information acquired from a vehicle to a server. The server analyzes the vehicle information received from the communication terminal to diagnoses the vehicle. A web screen provision portion in the server provides a web screen including instructions for a worker who diagnoses the vehicle in such a manner that the communication terminal can display the web screen through a communication network. The communication terminal displays the web screen, which is provided from the web screen provision portion, through the communication network.

A web screen including instructions for a worker who diagnoses a vehicle is provided from a server to a communication terminal through a communication network. Therefore, the worker can view the web screen displayed on the communication terminal for confirmation purposes and understand the instructions for the worker. The worker can diagnose the vehicle according to the instructions. In this instance, even when the instructions are complicated as they describe, for example, multiple procedures, the server sequentially updates the web screen as needed to properly give the complicated instructions to the worker.

As the instructions for the worker are provided by causing the server to provide web screens, it is possible to avoid an increase in the burden placed on the communication terminal without requiring a large-capacity storage portion for the communication terminal and complicated maintenance for software. Further, various web screens can be created to properly handle a wide variety of characteristics of the vehicle (for example, vehicle models, engine types, drive methods (2WD/4WD), and transmissions). This eliminates the necessity of preparing multiple communication terminals for different characteristics of the vehicle to be diagnosed. In other words, a wide variety of vehicles can be diagnosed by using one communication terminal. Moreover, any communication terminal can be used as far as it is capable of displaying a web screen. It signifies that a general communication terminal may be used. This requirement can be easily met. The web screen is a screen that can be published on the Internet by using a World Wide Web (WWW) system and includes, for example, text data, layout information based on Hyper Text Markup Language (HTML), and document-embedded images, audio, and movies.

While various embodiments, configurations, and aspects of the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects according to the present disclosure.

What is claimed is:

1. A vehicle diagnosis system comprising:
    a communication terminal that acquires vehicle information from a vehicle and transmits the vehicle information; and
    a server that receives the vehicle information from the communication terminal and analyzes the vehicle information to diagnose the vehicle,
    wherein:
    the server includes a web screen provision portion that provides a web screen including instructions to a worker diagnosing the vehicle;
    the communication terminal displays the web screen provided from the web screen provision portion through a communication network;
    the communication terminal transmits to the server, the vehicle information showing a status of a drive mechanism corresponding to work changing the status of the drive mechanism, the work being performed on the vehicle by the worker; and
    the web screen provision portion provides the web screen including the vehicle information showing the status of the drive mechanism corresponding to the work changing the status of the drive mechanism, the work being performed on the vehicle by the worker, so that the communication terminal enables to display the web screen through the communication network.

2. The vehicle diagnosis system according to claim 1, wherein:
    the web screen provision portion provides a plurality of web screens corresponding to instructions describing a plurality of procedures, so that the communication terminal enables to chronologically display the web screens through the communication network.

3. The vehicle diagnosis system according to claim 1, wherein:
    the web screen provision portion provides the web screen including a diagnosis result produced by the server, and the communication terminal enables to display the web screen through the communication network.

4. The vehicle diagnosis system according to claim 1, wherein:
    the communication terminal is portable by the worker.

5. A vehicle diagnosis system comprising:
    a communication terminal that acquires vehicle information from a vehicle and transmits the vehicle information; and
    a server that receives the vehicle information from the communication terminal and analyzes the vehicle information to diagnose the vehicle,
    wherein:
    the server includes a web screen provision portion that provides a web screen including instructions to a worker diagnosing the vehicle;
    the communication terminal displays the web screen provided from the web screen provision portion through a communication network;
    the server receives the vehicle information transmitted from the communication terminal through a different server;

the communication terminal receives web screen data providing the web screen transmitted from the server without going through the different server;

a route through which the vehicle information is transmitted from the communication terminal and received by the server is different from a route through which the web screen data providing the web screen is transmitted from the server and received by the communication terminal; and the web screen provision portion is adjustable of a time at which an instruction in the web screen is provided to the worker.

6. The vehicle diagnosis system according to claim 5, wherein:

when the server is ready to receive the vehicle information from the communication terminal, the web screen provision portion provides instructions regarding the vehicle information in the web screen to the worker.

7. The vehicle diagnosis system according to claim 5, wherein:

the web screen provision portion provides a plurality of web screens corresponding to instructions describing a plurality of procedures, so that the communication terminal enables to chronologically display the web screens through the communication network.

8. The vehicle diagnosis system according to claim 5, wherein:

the web screen provision portion provides the web screen including a diagnosis result produced by the server, so that the communication terminal enables to display the web screen through the communication network.

9. The vehicle diagnosis system according to claim 5, wherein:

the communication terminal is portable by the worker.

10. A server providing a vehicle diagnosis system together with a communication terminal and analyzing vehicle information received from the communication terminal to diagnose a vehicle, the communication terminal acquiring the vehicle information from the vehicle and transmitting the vehicle information to the server, the server comprising:

a web screen provision portion that provides a web screen including an instruction to a worker diagnosing the vehicle, causing the communication terminal to display the web screen through a communication network, wherein:

the web screen provision portion provides the web screen including the vehicle information showing a status of a drive mechanism corresponding to work changing the status of the drive mechanism, the work being performed on the vehicle by the worker, and the communication terminal enables to display the web screen through the communication network.

11. A server providing a vehicle diagnosis system together with a communication terminal and analyzing vehicle information received from the communication terminal to diagnose a vehicle, the communication terminal acquiring the vehicle information from the vehicle and transmitting the vehicle information to the server, the server comprising:

a web screen provision portion providing a web screen including an instruction to a worker diagnosing the vehicle, causing the communication terminal to display the web screen through a communication network, wherein:

the server receives the vehicle information transmitted from the communication terminal through a different server;

the server transmits web screen data providing the web screen to the communication terminal without going through the different server;

a route through which the vehicle information is transmitted from the communication terminal and received is different from a route through which the web screen data providing the web screen is transmitted and received by the communication terminal; and the web screen provision portion is adjustable of a time at which an instruction in the web screen is provided to the worker.

12. A non-transitory tangible computer readable storage medium having stored thereon a computer program that causes a computer provided to a server, which provides a vehicle diagnosis system together with a communication terminal acquiring vehicle information from a vehicle and transmitting the vehicle information to the server and analyzes the vehicle information received from the communication terminal to diagnose the vehicle, to perform:

providing a web screen including an instruction to a worker diagnosing a vehicle, causing the communication terminal to display the web screen through a communication network; and providing the web screen including vehicle information showing an engine speed corresponding to work changing the engine speed, the work being performed on the vehicle by the worker, so that the communication terminal display the web screen through the communication network.

13. A non-transitory tangible computer readable storage medium having stored thereon a computer program that causes a computer provided to a server that provides a vehicle diagnosis system together with a communication terminal that transmits vehicle information acquired from a vehicle to the server, the vehicle information transmitted from the communication terminal being received through a different server, web screen data providing a web screen being transmitted to the communication terminal without going through the different server, and a route through which the vehicle information is transmitted from the communication terminal and received being different from a route through which the web screen data providing the web screen is transmitted and received by the communication terminal, and analyzes the vehicle information received from the communication terminal to diagnose the vehicle, to permit:

providing the web screen including an instruction for a worker diagnosing a vehicle, causing the communication terminal to display the web screen through a communication network, the web screen including vehicle information showing an engine speed corresponding to work changing the engine speed, the work being performed on the vehicle by the worker; and adjusting a time at which an instruction in the web screen is notified to the worker.

* * * * *